US007233955B2

(12) United States Patent
Machida et al.

(10) Patent No.: US 7,233,955 B2
(45) Date of Patent: Jun. 19, 2007

(54) SYSTEM AND METHOD FOR SEARCHING AND RETRIEVING INFORMATION REGARDING RELATED GOODS AND SERVICES

(75) Inventors: Motohiro Machida, Tokyo (JP); Toshiki Iso, Yokosuka (JP); Masaji Katagiri, Fujisawa (JP); Toshiaki Sugimura, Yokohama (JP); Hidenori Shimizu, Hachioji (JP); Taro Sugahara, Tokyo (JP); Fumitoshi Ukai, Tokyo (JP); Hironori Bouno, Tokyo (JP); Kei Yuasa, Mountain View, CA (US); Marc McEachern, Tokyo (JP); Shinya Nakagawa, Mitaka (JP)

(73) Assignees: NTT DoCoMo, Inc., Tokyo (JP); Hewlett-Packard Company, Palo Alto, CA (US)

( * ) Notice: Subject to any disclaimer, the term of this patent is extended or adjusted under 35 U.S.C. 154(b) by 475 days.

(21) Appl. No.: 10/614,517

(22) Filed: Jul. 8, 2003

(65) Prior Publication Data

US 2005/0097079 A1    May 5, 2005

(30) Foreign Application Priority Data

Jul. 8, 2002   (JP) ............................. 2002-198948
Jul. 8, 2002   (JP) ............................. 2002-198988

(51) Int. Cl.
*G06F 7/00*   (2006.01)
(52) U.S. Cl. ........................... 707/102; 707/3; 709/229
(58) Field of Classification Search ................ 707/102, 707/3; 709/229
See application file for complete search history.

(56) References Cited

U.S. PATENT DOCUMENTS

| 5,675,738 | A | * | 10/1997 | Suzuki et al. ............... 709/219 |
| 5,987,446 | A | * | 11/1999 | Corey et al. .................... 707/3 |
| 6,098,065 | A | * | 8/2000 | Skillen et al. ................. 707/3 |
| 6,529,899 | B1 | * | 3/2003 | Kraft et al. .................... 707/3 |
| 6,609,106 | B1 | * | 8/2003 | Robertson .................... 705/26 |
| 2002/0032597 | A1 | * | 3/2002 | Chanos ........................ 705/10 |
| 2002/0087706 | A1 | * | 7/2002 | Ogawa ........................ 709/229 |
| 2002/0120680 | A1 | * | 8/2002 | Greco et al. ................ 709/203 |
| 2003/0074398 | A1 | * | 4/2003 | Matsuo ........................ 709/203 |

FOREIGN PATENT DOCUMENTS

WO    WO 00/25241    *  5/2000

* cited by examiner

*Primary Examiner*—Don Wong
*Assistant Examiner*—Michael Le
(74) *Attorney, Agent, or Firm*—Oblon, Spivak, McClelland, Maier & Neustadt, P.C.

(57) ABSTRACT

Method and computer program product stored on a tangible medium that store instructions including providing a procedure file, storing and managing a plurality of tickets, each ticket including a first identifier given to a commodity, and searching, based on the first identifier and a ticket request submitted by a user, a ticket of the plurality of tickets corresponding to the first identifier. The method and computer program product then presents information about the commodity included in the ticket, information about a service that provides the commodity, and service provision content information acquired during the search.

12 Claims, 21 Drawing Sheets

Fig.6

| (1) ID |
|---|
| (2) Service Entity Pointer |
| (3) Service Entity Access Protocol Storage Location Pointer |
| (4) Ticket Category |
| (5) Object Category |
| (6) Object Location |
| (7) Object Comments |
| (8) Service Category |
| (9) Service Location |
| (10) Service Comments |
| (11) Ticket Registrant Information |
| (12) Ticket Expiration Date |
| (13) Permission Information |

Fig.11A

| |
|---|
| ID: JAN490136036479 |
| Service Entity Pointer: URL: wine.provider.com |
| Service Entity Access Protocol Storage Location Pointer: http://tetuduki.com/asp1 |
| Ticket Category: primary |
| Object Category: wine |
| Object Location: NULL |
| Object Comments: French wine, white wine, from Provence |
| Service Category: NULL |
| Service Location: NULL |
| Service Comments: NULL |
| Ticket Provider Information: wine2235@xyz.co.jp |
| Ticket Expiration Date: December 31, 2015 |
| Permission Information: all |

Fig.11B

| |
|---|
| ID: JAN490136036479 |
| Service Entity Pointer: URL: wine.bar.co.jp |
| Service Entity Access Protocol Storage Location Pointer: http://tetuduki.com/asp2 |
| Ticket Category: secondary |
| Object Category: NULL |
| Object Location: NULL |
| Object Comments: NULL |
| Service Category: Restaurant, BAR, wine import and sale |
| Service Location: Shibuya |
| Service Comments: Provence wine |
| Ticket Provider Information: winebar1132@xyz.co.jp |
| Ticket Expiration Date: December 31, 2010 |
| Permission Information: all |

Fig.11C

| |
|---|
| ID: JAN490136036479 |
| Service Entity Pointer: URL: big-tour.co.jp |
| Service Entity Access Protocol Storage Location Pointer: http://tetuduki.com/open_card/28692.asp |
| Ticket Category: secondary |
| Object Category: NULL |
| Object Location: NULL |
| Object Comments: NULL |
| Service Category: winery tour, wine tasting tour |
| Service Location: Provence |
| Service Comments: Provence tour, Provence winery tour, Provence wine tasting tour |
| Ticket Provider Information: winetour2468@xyz.com |
| Ticket Expiration Date: December 31, 2002 |
| Permission Information: all |

Fig.12A

| | |
|---|---|
| ID: JAN490136036479 | |
| Service Entity Pointer: URL: wine.provider.com | |
| Service Entity Access Protocol Storage Location Pointer: http://tetuduki.com/asp1 | |
| Ticket Category: primary | |
| Object Category: wine | |
| Object Location: NULL | |
| Object Comments: French wine, white wine, from Provence (Location-ID245699) | |
| Service Category: NULL | |
| Service Location: NULL | |
| Service Comments: NULL | |
| Ticket Provider Information: wine2235@xyz.co.jp | |
| Ticket Expiration Date: December 31, 2015 | |
| Permission Information: all | |

Fig.12B

| | |
|---|---|
| ID: Location-ID245699 | |
| Service Entity Pointer: URL: wine.bar.co.jp | |
| Service Entity Access Protocol Storage Location Pointer: http://tetuduki.com/asp2 | |
| Ticket Category: primary | |
| Object Category: place | |
| Object Location: South France | |
| Object Comments: production area of wine (JAN490136036479), ancient castle hotel | |
| Service Category: NULL | |
| Service Location: NULL | |
| Service Comments: NULL | |
| Ticket Provider Information: Location@xyz.co.jp | |
| Ticket Expiration Date: December 31, 2010 | |
| Permission Information: all | |

Fig.12C

| | |
|---|---|
| ID: Location-ID245699 | |
| Service Entity Pointer: URL: big-tour.co.jp | |
| Service Entity Access Protocol Storage Location Pointer: http://tetuduki.com/open_card/28692.asp | |
| Ticket Category: secondary | |
| Object Category: NULL | |
| Object Location: NULL | |
| Object Comments: NULL | |
| Service Category: winery tour, wine tasting tour | |
| Service Location: Provence | |
| Service Comments: Provence tour, Provence winery tour, Provence wine tasting tour | |
| Ticket Provider Information: winetour2468@xyz.com | |
| Ticket Expiration Date: December 31, 2002 | |
| Permission Information: all | |

Fig. 13

Search ID : JAN490136036479

Name and others : wine (French wine, white wine, from Provence)

①Wine Bars          wine.bar.co.jp
②Join wine tours!   big-tour.co.jp
   (Provence tour, Provence winery tour,
    Provence wine tasting tour)

Fig.14

Search ID : JAN490136036479

Name and others : wine (French wine, white wine, from Provence)

【Recommendation】
★Join wine tours!  big-tour.co.jp
 (Provence tour, Provence winery tour,
  Provence wine tasting tour)

Fig.16A

| |
|---|
| ID:4901234petfood232 |
| Service Entity Pointer:URL:petfood.com |
| Service Entity Access Protocol Storage Location Pointer:http://tetuduki.com/asp1 |
| Ticket Category:primary |
| Object Category:petfood |
| Object Location:NULL |
| Object Comments:petfood information, petfood group membership registration, bulletin board |
| Service Category:NULL |
| Service Location:NULL |
| Service Comments:NULL |
| Ticket Provider Information:petfood.com@xyz.co.jp |
| Ticket Expiration Date:December 31, 2005 |
| Permission Information:all |

Fig.16B

| |
|---|
| ID:4901234petfood232 |
| Service Entity Pointer:URL:xyz.com/B_abc |
| Service Entity Access Protocol Storage Location Pointer:http://tetuduki.com/asp2 |
| Ticket Category:secondary |
| Object Category:petfood |
| Object Location:NULL |
| Object Comments:NULL |
| Service Category:NULL |
| Service Location:Tokyo |
| Service Comments:B's Website |
| Ticket Provider Information:petfood.com@xyz.co.jp |
| Ticket Expiration Date:December 31, 2005 |
| Permission Information:DogID=2232 or petfoodID=4901234petfood232 |

Fig.16C

| |
|---|
| ID:4901234petfood232 |
| Service Entity Pointer:URL:xyz.com/C_abc |
| Service Entity Access Protocol Storage Location Pointer:http://tetuduki.com/asp3 |
| Ticket Category:secondary |
| Object Category:petfood |
| Object Location:NULL |
| Object Comments:NULL |
| Service Category:NULL |
| Service Location:Kanagawa |
| Service Comments:C's Website |
| Ticket Provider Information:petfood.com@xyz.co.jp |
| Ticket Expiration Date:December 31, 2005 |
| Permission Information:DogID=3489 or petfoodID=4901234petfood232 |

Fig.17A

SERVICE PROVIDER PRESENTATION SCREEN
THAT PERSON A BEFORE REGISTRATION
AS MEMBER IS PERMITTED TO CONSULT

Search ID: 4901234petfood232
Name and others: petfood

・access to petfood information
・petfood group membership registration
・bulletin board

Fig.17B

PERSONAL INFORMATION OF PERSON
A BEFORE REGISTRATION AS MEMBER

<profile>
DogID=8989
petfoodID=NULL

Fig.19

| |
|---|
| ID:4901234petfood232 |
| Service Entity Pointer:URL:xyz.com/A_abc |
| Service Entity Access Protocol Storage Location Pointer:http://tetuduki.com/asp4 |
| Ticket Category:secondary |
| Object Category:petfood |
| Object Location:NULL |
| Object Comments:NULL |
| Service Category:NULL |
| Service Location:Tokyo |
| Service Comments:A's Website |
| Ticket Provider Information:petfood.com@xyz.co.jp |
| Ticket Expiration Date:December 31, 2005 |
| Permission Information:petfoodID=4901234petfood232 |

Fig.20A

SERVICE PROVIDER PRESENTATION SCREEN
THAT PERSON A AFTER REGISTRATION
AS MEMBER IS PERMITTED TO CONSULT

```
Search ID:4901234petfood232
Name and others:petfood

·access to petfood information
·petfood group membership registration
·bulletin board
①B's Web page
②C's Web page
```

Fig.20B

PERSONAL INFORMATION OF PERSON
A AFTER REGISTRATION AS MEMBER

```
<profile>
DogID=8989
petfoodID=4901234petfood232
```

SYSTEM AND METHOD FOR SEARCHING AND RETRIEVING INFORMATION REGARDING RELATED GOODS AND SERVICES

BACKGROUND OF THE INVENTION

1. Field of the Invention

The present invention relates to a service provision system for providing services on the basis of requests from service users (users) and a service provision method executed in the service provision system, and to an information provision control system and an information provision control method for providing service information to users through lateral linkage across two or more sorts of business fields.

The term "community" in the present specification generally refers to a group consisting of two or more users grouped based on predetermined criteria. Examples of the "community" can be a group consisting of users sharing a certain preference (or having a commonality about preference), a group consisting of users having purchased a certain commodity during a predetermined period of time, a group consisting of users having shopped at a certain shopping mall during a predetermined period of time, and so on, and include both groups voluntarily established by users and groups set based on statistical information about purchase of merchandise or the like by information providers or the like except for users.

2. Related Background Art

As means for users to receive services of some interest, it is common practice to provide a service together with services related thereto (for example, to provide a means for application to a tour and a means for application to a travel insurance simultaneously, to provide wine from France at a French restaurant, and so on). In the case of recent commercial transactions through the Internet, a Web page about one service is prepared while embedding therein hyperlinks to Web pages about services related thereto in advance, in order to establish lateral linkage across two or more sorts of business fields. For example, a Web page for application to a tour is provided with an embedded hyperlink to a Web page of an insurance company for application to travel insurance.

In the conventional method of providing services to users through lateral linkage across two or more sorts of business fields, however, the service providers needed to prepare relations among services to be linked, in the form of links of URLs in advance or needed to affiliate with a major service provider for comprehensively providing services. Even if the service providers prepared these links or affiliated with another service provider, types and ranges of providable services had to be fixed to some extent, which posed the problem that the users were given limited choices for services to be provided.

On the other hand, there existed the conventional concept of communities (groups consisting of two or more users grouped based on predetermined criteria), and some of such communities were operated so as to interconnect servers scattered over a network to make linkage of transmission of information among such servers. In order to maintain interconnections of the system, the users in such communities had to prepare relations among two or more systems to be linked, in the form of links of URLs in advance or had to affiliate with a major information provider for comprehensively providing information.

However, there was the problem that extremely complicated works were needed for the users and information providers in communities to construct the link information or the affiliation relation for maintaining the interconnections of the system.

In view of the problems in the prior art as described above, an object of the present invention is to implement timely service provision or information provision better suited for users, while reducing the efforts to construct the link information or affiliation relation to be prepared for linkage with many service providers (or information providers), for both the service providers (or information providers) and the users.

SUMMARY OF THE INVENTION

In order to achieve the above object, a service provision system according to the present invention is a service provision system comprising: a procedure file storing access method information for connection to a service; ticket storage-management means for storing and managing a ticket containing an identifier given to a commodity, an access address of a service provider for providing a service related to the commodity, storage location information of the procedure file, and both or one of information about the commodity and information about the service related to the commodity; search control means for, based on an identifier and a ticket request submitted by a user, letting the ticket storage-management means execute a search for a ticket corresponding to the identifier; access method information retrieving means for retrieving storage location information of a procedure file included in the ticket obtained by the search and retrieving access method information from the procedure file on the basis of the storage location information; service information acquiring means for retrieving an access address of a service provider included in the ticket obtained by the search, demanding service provision content information from the service provider on the basis of the access address of the service provider, and acquiring the service provision content information in accordance with an access method stored in the procedure file about the service; and presentation control means for presenting to the user the information about the commodity included in the ticket, the information about the service, the access method information retrieved, and the service provision content information acquired, wherein the ticket is allowed to contain information for deriving an identifier different from the aforementioned identifier, as the information about the commodity or as the information about the service, and wherein the search control means lets the ticket storage-management means further execute derivation of a different identifier based on information acquired from the ticket obtained by the search, and a search for a ticket corresponding to the different identifier.

In the above service provision system, there exists a procedure file storing access method information for connection to a service, and the ticket storage-management means stores and manages a ticket containing an identifier given to a commodity, an access address of a service provider for providing a service related to the commodity, storage location information of a procedure file, and both or one of information about the commodity and information about the service related to the commodity. When a user requests a ticket by an identifier and a ticket request, the search control means lets the ticket storage-management means execute a search for the ticket corresponding to the identifier, based on the identifier and the ticket request. Here the ticket storage-management means performs the search for the ticket corresponding to the identifier, whereby the ticket is obtained as a result of the search.

Then the access method information retrieving means retrieves the storage location information of the procedure file included in the ticket obtained by the search and retrieves the access method information from the procedure file on the basis of the storage location information. The service information acquiring means retrieves the access address of the service provider included in the ticket obtained by the search, demands the service provision content information from the service provider on the basis of the access address of the service provider, and acquires the service provision content information in accordance with the access method stored in the procedure file about the service.

Furthermore, the presentation control means presents to the user the information about the commodity included in the ticket, the information about the service, the access method information retrieved, and the service provision content information acquired. This permits the user to obtain the information about the commodity included in the ticket corresponding to the desired identifier, the information about the service, the access method information retrieved based on the storage location information of the procedure file included in the ticket, and the service provision content information acquired based on the access address of the service provider included in the ticket.

In the service provision system of this configuration, according to the present invention, the above ticket is allowed to contain information for deriving an identifier different from the foregoing identifier, as the information about the commodity or as the information about the service, and the search control means lets the ticket storage-management means further execute derivation of a different identifier based on information acquired from the ticket obtained by the search (i.e., the ticket corresponding to the identifier submitted by the user) and a search for a ticket corresponding to the different identifier. The "information for deriving a different identifier" may include the different identifier itself in some cases.

Here the ticket storage-management means performs the search for the ticket corresponding to the different identifier in a similar fashion to the above, whereby a new ticket is obtained as a result of the search. Then the access method information retrieving means retrieves the storage location information of the procedure file included in the new ticket obtained by the search and retrieves the access method information from the procedure file on the basis of the storage location information. The service information acquiring means retrieves an access address of a service provider included in the new ticket obtained by the search, demands the service provision content information from the service provider on the basis of the access address of the service provider, and acquires the service provision content information in accordance with an access method stored in the procedure file about the service. Furthermore, the presentation control means presents to the user information about a commodity included in the new ticket, information about a service, the access method information retrieved, and the service provision content information acquired.

The new ticket correlated with the information for deriving the different identifier, which is included in the ticket, is obtained in this way, and information about a new commodity (e.g., a commodity linked to the original commodity), information about a new service (e.g., a service linked to the original service), access method information thereof, and service provision content information thereof can be obtained from the information of the new ticket in much the same manner as above.

By configuring one ticket to contain the information for deriving a different identifier in this way, it becomes feasible to implement a search for a ticket with the use of the different identifier and the presentation of the information about a new commodity included in the new ticket obtained by the search, the information about a new service, the access method information thereof, and the service provision content information thereof to the user. This can reduce the efforts needed before to construct the link information or the affiliation relation to be prepared for linkage among two or more service providers. The present invention also expands the range of selectable service providers for the users and thus reduces the efforts as needed before to find out a service provider best suited for the each by use of a search engine on the Internet by himself or herself, thus enhancing user's convenience.

The "identifier" in the present invention embraces, for example, an identifier for identifying a commodity, an identifier about a location such as a location of sale of a commodity, a location of provision of a service, or the like, an identifier of an image file such as a moving picture, a still picture, or the like to advertise or introduce the contents of a commodity or a service, and so on.

In a preferred configuration, the service provision system according to the present invention further comprises request accepting means for accepting an identifier and a ticket request submitted by a user, with identification information of the user; and user information memory means for memorizing user information containing user's preference information and service use information, in correlation with identification information of a user, wherein the presentation control means retrieves from the user information memory means, user information correlated with identification information of a user acquired in acceptance by the request accepting means, selects a service provider on the basis of the user information and the service provision content information, and presents to the user, service provision content information and access method information about the service provider thus selected. The user information embraces, for example, such information as a name and an address of a user, interests and preference, a list of possessions, types of permitted transactions, an access history to various service providers, a use history thereof, and so on.

In this case, the service provision system comprises the user information memory means which memorizes the user information containing the user's preference information and the service use information in correlation with the identification information of the user, and the request accepting means accepts an identifier and a ticket request submitted by a user, along with the identification information of the user. The presentation control means retrieves the user information correlated with the identification information of the user obtained in acceptance by the request accepting means, from the user information memory means, selects a service provider on the basis of the user information and the service provision content information, and presents the service provision content information and the access method information about the service provider thus selected, to the user.

For this reason, the service provider is selected based on the user information containing the user's preference information and the service use information and on the service provision content information, whereby it is feasible to more surely select the service provider of the service assumed to draw interest or attention of the user, and to present the service provision content information and the access method information about the selected service provider to the user. This permits the service providers to present the service provision contents more certainly to users with high probability of becoming customers of their commodities or users of their services, and also permits the users to gain information about commodities and services of their own interest or attention more surely; it thus implements provision of highly useful services.

In another preferred configuration of the service provision system according to the present invention, the presentation control means performs a search with a search engine, using a keyword included in the information about the commodity or in the information about the service, as a search key, and presents to the user, link information obtained by the search.

In this case, the search is carried out with the search engine, using the keyword included in the information about the commodity or in the information about the service in the ticket, as a search key, whereby the user can gain the link information obtained by the search. Therefore, the user does not have to make an effort of carrying out the search with the search engine using the keyword as a search key by himself or herself, which can reduce the load on the user.

Incidentally, the invention directed to the above service provision system can also be taken from an aspect of the invention directed to a service provision method as described below. Since the aspects of the invention directed to these are based on the same technical concept, they present similar operation and effect.

Namely, a service provision method according to the present invention is a service provision method executed in a service provision system comprising: a procedure file storing access method information for connection to a service; and ticket storage-management means for storing and managing a ticket containing an identifier given to a commodity, an access address of a service provider for providing a service related to the commodity, storage location information of the procedure file, and both or one of information about the commodity and information about the service related to the commodity, the service provision method comprising: a search control step of, based on an identifier and a ticket request submitted by a user, letting the ticket storage-management means execute a search for a ticket corresponding to the identifier; an access method information retrieving step of retrieving storage location information of a procedure file included in the ticket obtained by the search and retrieving access method information from the procedure file on the basis of the storage location information; a service information acquiring step of retrieving an access address of a service provider included in the ticket obtained by the search, demanding service provision content information from the service provider on the basis of the access address of the service provider, and acquiring the service provision content information in accordance with an access method stored in the procedure file about the service; and a presentation control step of presenting to the user the information about the commodity included in the ticket, the information about the service, the access method information retrieved, and the service provision content information acquired, wherein the ticket is allowed to contain information for deriving an identifier different from the aforementioned identifier, as the information about the commodity or as the information about the service related to the commodity, and wherein the search control step is to let the ticket storage-management means further execute derivation of a different identifier based on information acquired from the ticket obtained by the search, and a search for a ticket corresponding to the different identifier. It is also noted that the "information for deriving a different identifier" may include the different identifier itself in some cases.

In a preferred form of the service provision method according to the present invention, the service provision system further comprises: request accepting means for accepting an identifier and a ticket request submitted by a user, with identification information of the user; and user information memory means for memorizing user information containing user's preference information and service use information, in correlation with identification information of a user, and the presentation control step is to retrieve from the user information memory means, user information correlated with identification information of a user acquired in acceptance by the request accepting means, select a service provider on the basis of the user information and the service provision content information, and present to the user, service provision content information and access method information about the service provider thus selected.

In a further preferred form of the service provision method according to the present invention, the presentation control step is to perform a search with a search engine, using a keyword included in the information about the commodity or in the information about the service, as a search key, and present to the user, link information obtained by the search.

In order to achieve the above object, an information provision control system according to the present invention is an information provision control system comprising: a procedure file storing access method information for connection to a service; ticket storage-management means for storing and managing a ticket containing an identifier given to a commodity, an access address of a service provider for providing a service related to the commodity, storage location information of the procedure file, and both or one of information about the commodity and information about the service related to the commodity; request accepting means for accepting an identifier and a ticket request submitted by a user, with identification information of the user; user information memory means for memorizing user information containing user's preference information and service use information, in correlation with identification information of a user; search control means for, based on an identifier and a ticket request acquired in acceptance by the request accepting means, letting the ticket storage-management means execute a search for a ticket corresponding to the identifier; access method information retrieving means for retrieving storage location information of a procedure file included in the ticket obtained by the search and retrieving access method information from the procedure file on the basis of the storage location information; service information acquiring means for retrieving an access address of a service provider included in the ticket obtained by the search, demanding service provision content information from the service provider on the basis of the access address of the service provider, and acquiring the service provision content information in accordance with an access method stored in the procedure file about the service; and presentation control means for presenting to the user the information about the commodity included in the ticket, the information about the service, the access method information retrieved, and the service provision content information acquired, wherein the ticket contains permission condition information indicating a condition for a user to whom presentation of the information included in the ticket is permitted, and wherein the presentation control means is configured to retrieve from the user information memory means, user information correlated with identification information of the user acquired in the acceptance, determine whether the presentation of the information in the ticket to the user is to be permitted, based on the user information and the permission condition information in the ticket, and perform the presentation to the user when the presentation is permitted.

The above information provision control system comprises a procedure file storing access method information for connection to a service, and the user information memory means memorizing the user information containing the user's preference information in correlation with the identification information of a user, and the ticket storage-management means stores and manages a ticket containing an identifier given to a commodity, an access address of a service provider for providing a service related to the commodity, storage location information of a procedure file, and both or one of information about the commodity and the information about the service related to the commodity. When a user requests a ticket by an identifier and a ticket request with the identification information of the user, the request accepting means accepts the identifier and ticket request with the identification information of the user, and the search control means lets the ticket storage-management means execute a search for the ticket corresponding to the identifier, based on the identifier and ticket request. The user information embraces, for example, such information as a name and an address of a user, interests and preference, a list of possessions, types of permitted transactions, an access history to various service providers, a use history thereof, and so on.

The ticket storage-management means performs the search for the ticket corresponding to the identifier, whereby the ticket is obtained as a result of the search. Here, the access method information retrieving means retrieves the storage location information of the procedure file included in the ticket obtained by the search, and retrieves the access method information from the procedure file on the basis of the storage location information. The service information acquiring means retrieves the access address of the service provider included in the ticket obtained by the search, demands the service provision content information from the service provider on the basis of the access address of the service provider, and acquires the service provision content information in accordance with the access method stored in the procedure file about the service.

Then the presentation control means presents to the user the information about the commodity included in the above ticket, the information about the service, the access method information retrieved, and the service provision content information acquired. This permits the user to obtain the information about the commodity included in the ticket correlated with the desired identifier, the information about the service, the access method information retrieved based on the storage location information of the procedure file included in the ticket, and the service provision content information acquired based on the access address of the service provider included in the ticket.

Particularly, when the present invention is applied to a community, it is feasible to decrease the efforts to construct the link information or the affiliation relation as needed before and to achieve facilitation of operation of the community.

In the information provision control system as described above, according to the present invention, the above ticket contains the permission condition information indicating the condition for a user to whom presentation of the information included in the ticket is permitted, and the presentation control means retrieves the user information correlated with the identification information of the user obtained in acceptance, from the user information memory means, and determines whether the presentation of the information in the ticket to the user should be permitted, based on the user information and the permission condition information included in the ticket. When the presentation is permitted, the presentation control means then presents the information in the ticket to the user. For this reason, the information in the ticket is presented to only the authorized user according to the permission condition information in the ticket.

According to the present invention, as described above, it is feasible to reduce the efforts to construct the link information or the affiliation relation as needed before. In general, a community is not established for the purpose of presenting information to the general public, but for the purpose of presenting information to specific users (i.e., members of the community) promising compliance with predetermined rules, and thus the presentation of information to only authorized users according to the contents of information can improve the convenience for information originators and users.

In a preferred configuration of the information provision control system according to the present invention, the system further comprises user registration means for keeping and managing predetermined registration information of users belonging to a community and, in response to a registration request from a user, registering registration information of the user; and ticket registration requesting means for accepting a registration request for registration of a ticket containing an identifier given to a commodity related to user information of the user and an access address of the user, which is submitted from the registered user becoming the service provider and desiring to provide information of the access address of the user, and requesting the ticket storage-management means to register the ticket, wherein the ticket storage-management means registers a new ticket containing the identifier and the access address, based on the registration request for registration of the ticket.

In this case, the user registration means keeps and manages the predetermined registration information of users belonging to the community and registers the registration information of a user in response to a registration request from the user. When the user registered becomes a service provider, desires to provide the information of the access address of the user to the other users, and requests registration of a ticket containing an identifier given to a commodity related to the user information of the user and the access address of the user, the ticket registration request means accepts the request for registration of the ticket and requests the ticket storage-management means to register the ticket. Based on the request for registration of the ticket, the ticket storage-management means registers a new ticket containing the identifier and the access address. This makes it feasible to present the information of the new ticket to the other users using the information provision control system, and the foregoing user can readily construct the scheme of presenting the service provision information of its own to the other users, by simply submitting the user registration request to the community and submitting the request for registration of the ticket.

In another preferred configuration, the information provision control system according to the present invention further comprises user registration means for keeping and managing predetermined registration information of users belonging to a community and, in response to a registration request from a user, registering registration information of the user; and user information managing means for accepting an information presentation request for presentation of information of a ticket about a commodity related to the user information of the user from the registered user, and updating the user information of the user memorized in the user information memory means, to correlate the user information of the user with the permission condition information about the ticket so as to permit the presentation of the information in the ticket to the user.

In this case, the user registering means keeps and manages the predetermined registration information of users belonging to the community, and registers the registration information of a user in response to the request for registration from the user. When the user registered requests presentation of information of a ticket about a commodity related to the user information of the user, the user information managing means accepts the request for presentation of information of the ticket, and updates the user information of the user memorized in the user information memory means, while correlating the user information of the user with the permission condition information about the ticket so as to permit the presentation of the information in the ticket to the user.

This results in permitting the presentation of the information in the ticket to the user, based on the updated user information of the user and the permission condition information about the ticket. Thereafter, the pertinent user becomes able to receive the presentation of information included in the ticket desired by himself or herself. As described, the above user can readily receive the presentation of information in the ticket desired by himself or herself, by simply submitting the user registration request for registration with the community and submitting the information presentation request for the ticket.

Incidentally, the invention directed to the above information provision control system can also be taken from an aspect of the invention directed to an information provision control method as described below. Since these aspects of the invention are based on the same technical idea, they achieve similar operation and effect.

Namely, an information provision control method according to the present invention is an information provision control method executed in an information provision control system comprising: a procedure file storing access method information for connection to a service; ticket storage-management means for storing and managing a ticket containing an identifier given to a commodity, an access address of a service provider for providing a service related to the commodity, storage location information of the procedure file, and both or one of information about the commodity and information about the service related to the commodity; and user information memory means for memorizing user information containing user's preference information, in correlation with identification information of a user, the information provision control method comprising: a request accepting step of accepting an identifier and a ticket request submitted by a user, with identification information of the user; a search control step of, based on the identifier and the ticket request acquired in the accepting step, letting the ticket storage-management means execute a search for a ticket corresponding to the identifier; an access method information retrieving step of retrieving storage location information of a procedure file included in the ticket obtained by the search and retrieving access method information from the procedure file on the basis of the storage location information; a service information acquiring step of retrieving an access address of a service provider included in the ticket obtained by the search, demanding service provision content information from the service provider on the basis of the access address of the service provider, and acquiring the service provision content information in accordance with an access method stored in the procedure file about the service; and a presentation control step of presenting to the user the information about the commodity included in the ticket, the information about the service, the access method information retrieved, and the service provision content information acquired, wherein the ticket contains permission condition information indicating a condition for a user to whom presentation of the information included in the ticket is permitted, and wherein the presentation control step is configured to retrieve from the user information memory means, user information correlated with identification information of a user acquired in the accepting step, determine whether presentation of the information in the ticket to the user is to be permitted, based on the user information and the permission condition information in the ticket, and perform the presentation to the user when the presentation is permitted.

In a preferred form of the information provision control method according to the present invention, the information provision control system further comprises user registration means for keeping and managing predetermined registration information of users belonging to a community and, in response to a registration request from a user, registering registration information of the user; and the information provision control method further comprises: a registration request step of, based on a registration request for registration of a ticket containing an identifier given to a commodity related to the user information of the user and an access address of the user, which is submitted by the registered user becoming the service provider and desiring to provide information of the access address of the user, requesting the ticket storage-management means to register the ticket; and a ticket registering step of letting the ticket storage-management means register a new ticket containing the identifier and the access address, based on the registration request for registration of the ticket.

In a further preferred form of the information provision control method according to the present invention, the information provision control system further comprises user registration means for keeping and managing predetermined registration information of users belonging to a community and, in response to a registration request from a user, registering registration information of the user, and the information provision control method further comprises a user information updating step of, based on an information presentation request for presentation of information of a ticket about a commodity related to the user information of the user, which is submitted by the registered user, updating the user information of the user memorized in the user information memory means, to correlate the user information of the user with the permission condition information about the ticket so as to permit the presentation of the information in the ticket to the user.

BRIEF DESCRIPTION OF THE DRAWINGS

FIG. 6 is a diagram showing a structure of a ticket.

FIG. 11A is a diagram showing a first example of the search result for the ticket with ID: JAN490136036479.

FIG. 11B is a diagram showing a second example of the search result for the ticket with ID: JAN490136036479.

FIG. 11C is a diagram showing a third example of the search result for the ticket with ID: JAN490136036479.

FIG. 12A is a diagram showing a fourth example of the search result for the ticket with ID: JAN490136036479.

FIG. 12B is a diagram showing a first example of the search result for the ticket obtained by the search using Location-ID245699 described in the box of Object Comments of the ticket in FIG. 12A, as a key.

FIG. 12C is a diagram showing a second example of the search result for the ticket obtained by the search using Location-ID245699 described in the box of Object Comments of the ticket in FIG. 12A, as a key.

FIG. 13 is a diagram showing an example of an optimal service provider list related to the search result of FIGS. 11A–11C.

FIG. 14 is a diagram showing an example of an optimal service provider list related to the search result of FIGS. 12A–12C.

FIG. 16A is a diagram showing a first example of the search result for the ticket with ID: predetermined petfood ID.

FIG. 16B is a diagram showing a second example of the search result for the ticket with ID: predetermined petfood ID.

FIG. 16C is a diagram showing a third example of the search result for the ticket with ID: predetermined petfood ID.

FIG. 17A is a diagram showing a service provider presentation screen which person A before registration as a member can consult.

FIG. 17B is a diagram showing personal information of A before registration as a member.

FIG. 19 is a diagram showing an example of a ticket registered through registration as a member.

FIG. 20A is a diagram showing a service provider presentation screen which A after registration as a member can consult.

FIG. 20B is a diagram showing personal information of A after registration as a member.

DESCRIPTION OF THE PREFERRED EMBODIMENTS

Various embodiments of the present invention will be described below with reference to the drawings. In the description hereinafter the "identifier" according to the present invention will be referred to as "ID". A ticket will refer to information containing descriptions of information about a commodity corresponding to an ID, an address of a service provider associated with provision of a service related to the commodity, an access method thereto, a service category of the service, etc., and will be detailed later with reference to FIG. 6.

First Embodiment

Configuration of Service Provision System

Figure 1:
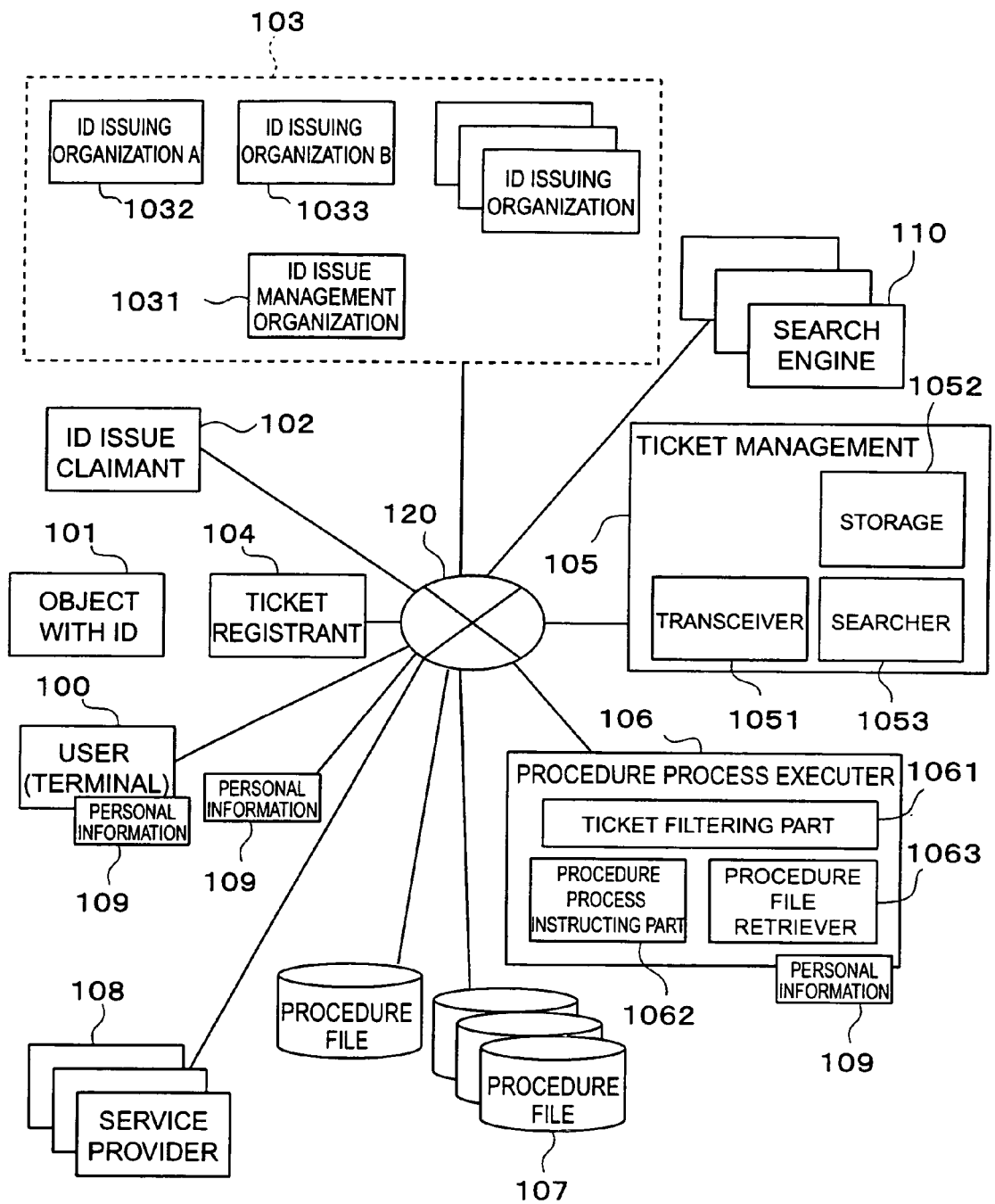
FIG. 1 is a diagram showing a whole configuration of a service provision system in the first embodiment.

FIG. 1. shows the entire configuration of the service of provission system according to the first embodiment. As shown in this FIG. 1., the service provision system of the first embodiment is comprised of the following componets connected or connectable to network 120. Namely, the service provision system is comprised of terminal equipment 100 such as a personal computer (PC), a PDA (Personal Digital Assistant), or a cell phone of a user to recieve provision of a service; an ID issue requester 102 to submit a request for issue of a new ID to an object to be given an ID(e.g., an agency engaging in development and production of a new commodity, a party having gotten a commodity through purchase or the like, etc.); group 103 of ID issuing organizations permitted to perform the issue of an ID; ticket registrant 104 to request registration of a ticket; ticket management part 105 confirgured to perform storage and management of tickets a serch for a ticket; procedure process executer 106 configured to mediate a service to preset candidates of service provides to users and to carry out procedures associated therwith for the users; procedure file 107; service provider 108 to provide services throuhg a network, such as sale, repair, or provision of information; personal information 109; and serch engine 110.

Among these, the group 103 of ID issuing organizations is comprised of ID issue management organization 1031 engaging in total management and operation of ID issue rules for the group 103 of organizations involved in issue of ID; and a plurality of ID issuing organizations 1032, 1033 permitted to issue an ID on the basis of the ID issuing rules given by the ID issue management organization 1031.

The ticket management part 105 is comprised of transceiver 1051 engaging in reception of a ticket registration request to the ticket management part 105, transmission of the result of a search, etc.; storage 1052 being a huge database to store tickets; and search part 1053 engaging in searching for a ticket.

The procedure process executer 106 is comprised of ticket filtering part 1061 configured to select a ticket about a service provider which is requested by a user and about which the user is permitted to conduct a procedure, from the result (a plurality of tickets) of a ticket search based on an ID; procedure file retrieving part 1063 configured to retrieve a procedure file of a ticket from a procedure file storage location described in the ticket (i.e., storage location information (also referred to as a service entity access protocol storage location pointer) of the procedure file 107 about access method information to a service provider); and procedure process instructing part 1062 configured to order a procedure on the basis of a procedure process.

The procedure file 107 is a file containing a description of a protocol used for a procedure and indispensable information (e.g., in the case of the protocol determined in the automotive industry, the information concerns a cipher communication system generally used in the Internet, a unique procedure protocol, and a type of information necessary for the procedure), and is open to the public to permit anyone to access it through network 120. This permits a party intending to provide a new service, to start use by simply selecting an optimal procedure process out of various procedure processes open to the public and writing a storage location of its procedure file in a ticket. Concerning the procedure file 107, it is also possible to perform authentication of a party requesting information and take a measure to properly limit access thereto, according to the need for ensuring security.

The personal information 109 used in the processing described hereinafter contains information such as a name and an address, interests and preference, a list of possessions, types of permitted transactions, an access history to various service providers and a use history thereof, and so on, and this personal information 109 may be held in the terminal 100 by the user, may be held in a format like a Web page in the network, or may be held in the procedure process executer 106 which introduces service providers and mediates procedures.

The ID-attached object 101 is comprised of an object given an identifier consisting of a combination of numerals and characters by a bar code, a two-dimensional bar code, an RF-ID, or an infrared tag, or the like (a physical object such as a bottle or paper, or an electronic object such as a sound file or an image file).

Various Processes Associated with Service Provision

The various processes associated with service provision, which are executed in the above service provision system, will be described below.

ID Issuing Organization Certifying Process and ID Issuing Process

Figure 2:
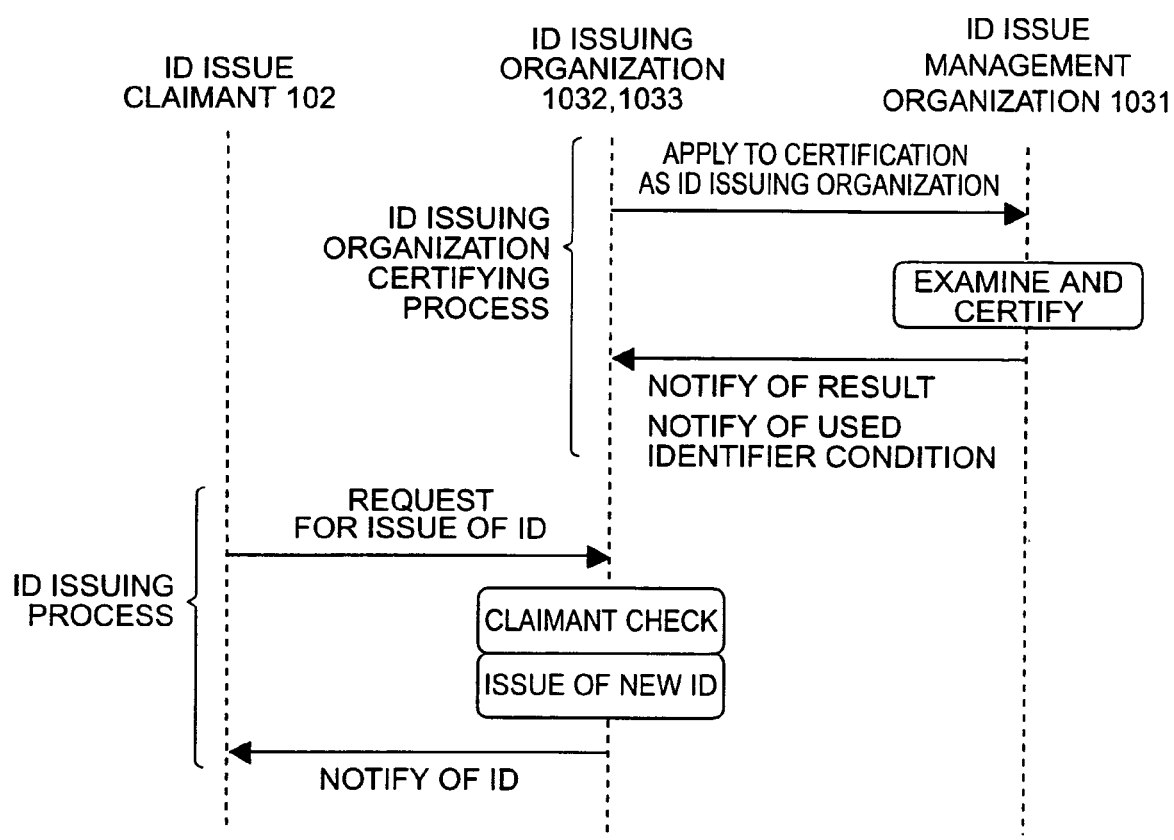
FIG. 2 is a diagram for explaining an ID issuing organization certifying process and an ID issuing process.

FIG. 2 shows the ID issuing organization certifying process and ID issuing process. As shown in this FIG. 2, an organization desiring to be certified and registered as an ID issuing organization applies for certification and registration as an ID issuing organization with the ID issue management organization 1031. The ID issue management organization 1031 examines whether the applying organization can adequately observe the ID issue rules and other rules defined by the ID issue management organization 1031. When the condition is met, the management organization 1031 certifies the applying organization as an ID issuing organization and notifies it of a rule of issuing IDs that the applying organization can issue. Specific examples of the ID issuing rule are "a character string of JAN must be given at the head of every ID assigned by ID issuing organization A," "a character string of ISBN must be given at the head of every ID assigned by ID issuing organization B," and so on.

When the certified ID issuing organization 1032, 1033, etc. receives a request for issue of an ID from the ID issue requester 102, it examines (or checks) the name, address, and reliability of the ID issue requester 102. When a predetermined condition is met, it issues an ID in accordance with the ID issuing rule defined by the ID issue management organization 1031 and notifies the ID issue requester 102 of the ID. By observing this issuing rule, it becomes feasible to prevent presence of redundant IDs and to manage the various conventionally existing ID systems as redundancy-free identifier systems.

Figure 3:
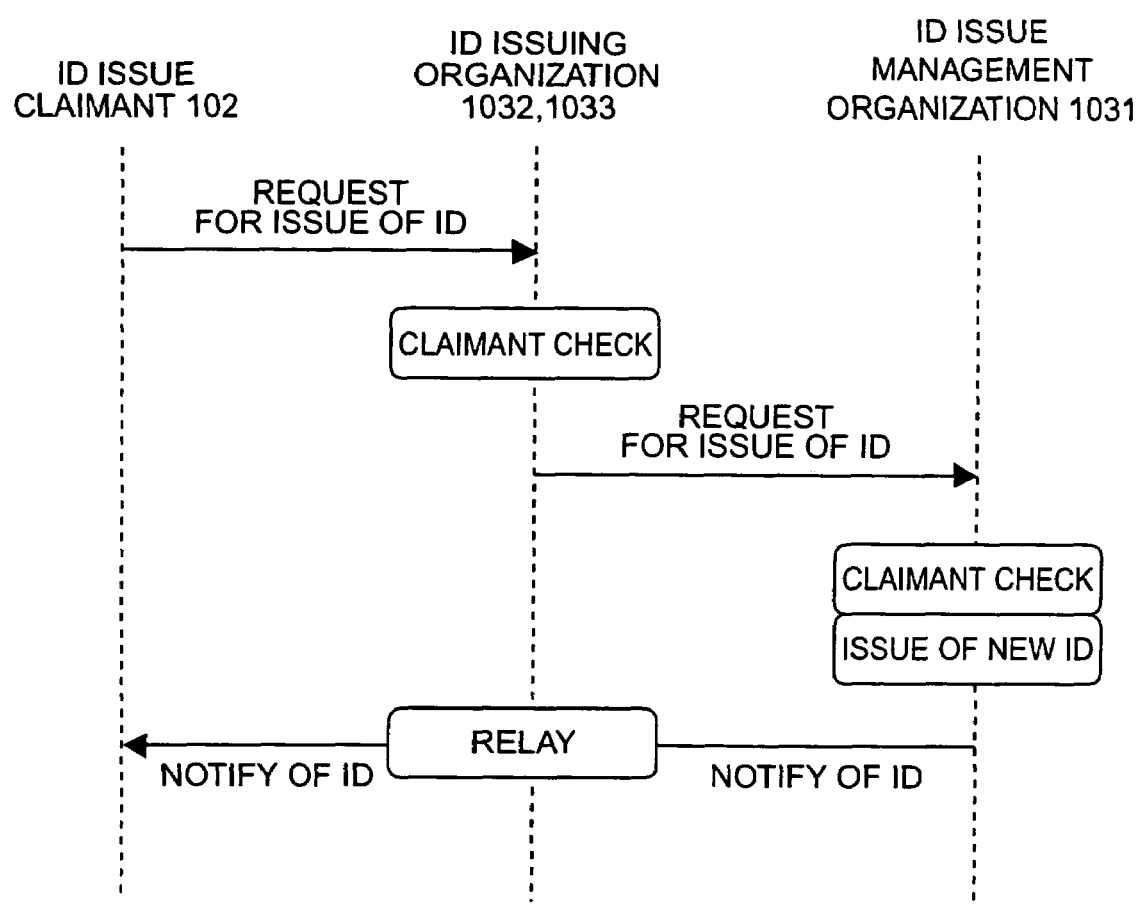
FIG. 3 is a diagram for explaining another ID issuing process executed by an ID issuing organization so as to avoid duplication of ID, without the ID issuing organization certifying process.

FIG. 3 is a diagram to illustrate another ID issuing process capable of avoiding redundancy of IDs without execution of the ID issuing organization certifying process. As shown in this FIG. 3, every time the ID issuing organization 1032 or the like accepts an ID issue request from ID issue requester 102, it first submits an ID issue request to the ID issue management organization 1031. The ID issue management organization 1031 examines whether the ID issuing organization 1032 or the like having submitted the ID issue request can observe the ID issuing rules and other rules defined by the ID issue management organization 1031. When the condition is met, it issues a new ID to the ID issuing organization 1032 or the like having submitted the ID issue request, and notifies the organization of the ID. The ID issuing organization 1032 or the like, receiving the notification, notifies the ID issue requester 102 of the ID, whereby the ID issue requester 102 can obtain the ID.

The ID issue management organization 1031 described with FIG. 3 is constructed in the form adapted for individual ID issue requests in the case where it can manage and operate the issue of all IDs; this configuration is thus substantially a form wherein the ID issue management organization 1031 issues IDs.

Ticket Registration and Update Process

Figure 4:
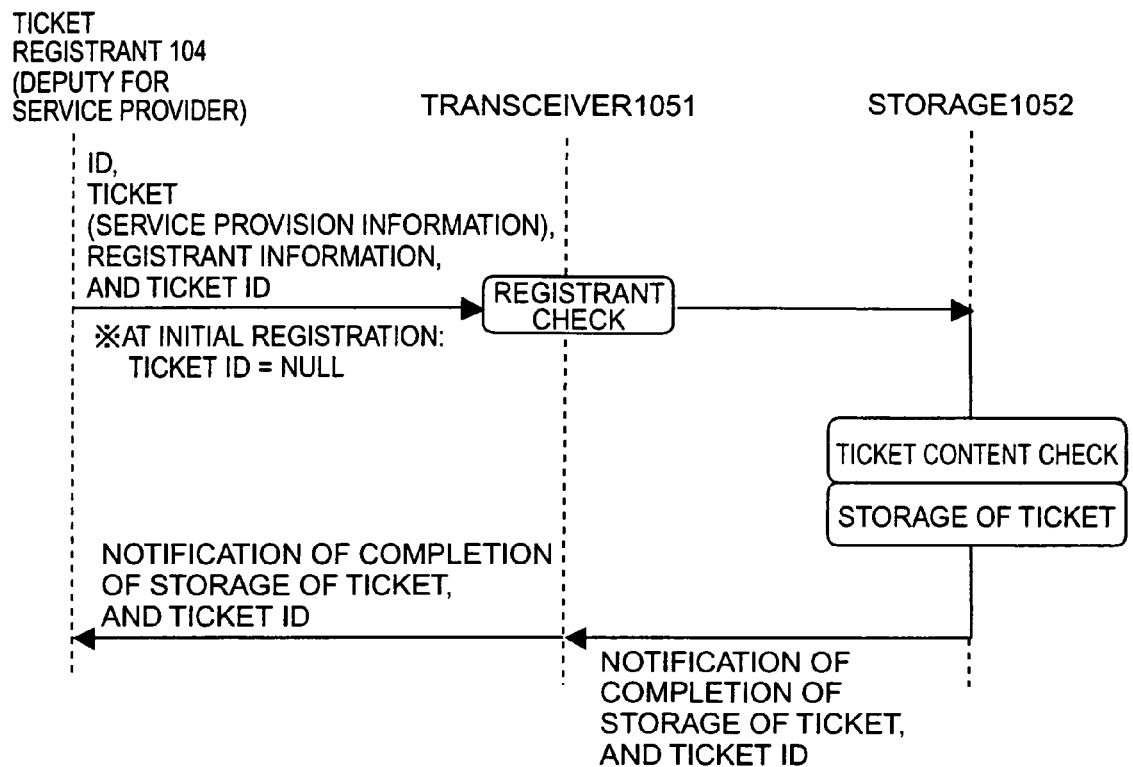
FIG. 4 is a diagram for explaining a ticket registration and update process by a ticket management part.

FIG. 4 is a diagram to illustrate the ticket registration and update process carried out by the ticket management part 105. As shown in this FIG. 4, the ticket management part 105 receives a ticket registration request from ticket registrant 104. The ticket registration request is generally considered to be submitted by a party providing a service about an object (commodity) given an ID (specifically, an import agent dealing with wine of ID=1224 given by a wine producer). It is, however, noted that a ticket may be registered by a third-party deputy (e.g., a sale promotion, planning contractor commissioned by the foregoing import agent). When the ticket registrant 104 requests the ticket management part 105 to update the ID, the ticket, registrant information (e.g., the name, the address on the network, or the like), or the contents of the ticket, it transmits an identification number of the ticket (hereinafter referred to as "ticket ID") assigned upon the last registration of the ticket. The transceiver 1051 examines the received registrant information and, when the condition is met, it stores the ticket into the storage 1052. The storage 1052 checks the contents of the ticket to check whether the format of the ticket is correct, whether there is an error in the contents described in the ticket, and so on. If there is no problem, the ticket is stored into the storage 1052. Then the storage 1052 transmits a ticket storage completion notification indicating the completion of storage of the ticket, and the ticket ID of the stored ticket to the ticket registrant 104. This ticket ID is again used upon a next update necessitated because of a change in the contents of the ticket.

Ticket Search Process and Procedure Process

Next, the ticket search process executed by the ticket management part 105 and the procedure process executed by the procedure process executer 106 will be described with reference to FIG. 5. The flows of the individual processes will be described later with FIGS. 8, 9, and 10.

First, user 100, acquiring an ID from object 101 given the ID, transmits the ID, a ticket request necessary for provision of a service (an optimal service provider request), and user information to the procedure process instructing part 1062 of the procedure process executer 106. In order to make a search to determine "What is the received ID?" and "What is a service related to the ID?," the procedure process instructing part 1062 transmits the ID, the ticket request, and claimant information (information about the procedure process executer 106 including the procedure process instructing part 1062) to the transceiver 1051 of the ticket management part 105.

The transceiver 1051, receiving the ID, the ticket request, and the claimant information, checks the claimant information, and transmits the ID and the ticket request to the search part 1053 if there is no problem. The search part 1053 checks whether the contents of the ticket request received involve a problem of discrepancy or the like, and if there is no problem then the search part 1053 transmits the ID and a ticket search request to the storage 1052. The storage 1052 performs the ticket search process on the basis of the received ID and ticket search request, checks an expiration date of each ticket obtained by the search, and transfers every ticket having an effective expiration date as a result of the search to the transceiver 1051. The tickets as a result of the search are transferred to the procedure file retrieving part 1063.

For each of the received tickets, the procedure file retrieving part 1063 retrieves the procedure information from the procedure file 107 thereof on the basis of the procedure file storage location information described in the ticket and transmits it to the procedure process instructing part 1062. Then the procedure process instructing part 1062 determines for each ticket whether the user 100 is permitted to go through the procedure, based on the personal information 109 and procedure information about the user 100 having submitted the ticket request, thereby performing a procedure availability check to select only permitted tickets out of the received tickets.

For each of the tickets judged as permitted, the procedure process instructing part 1062 sends a service provision content detail inquiry request to service provider 108 to acquire service provision detail content information (e.g., information such as "sale of French wine, inquiry ID, sales price of commodity: ¥4500, delivery: as soon as the commodity arrives, and expected to be delivered about two months after") in accordance with an access method stored in the procedure file 107 about the service.

The above process of "transmitting the ID, ticket request, and claimant information to the transceiver 1051 of the ticket management part 105, submitting the service provision content detail inquiry request to the service provider 108, and receiving the service provision detail content information" as executed by the procedure process executer 106 will be referred to as service provider candidate extracting process 501. By repeatedly executing this service provider candidate extracting process 501 on the basis of the information described in the received ticket (an ID, comments about a commodity, comments about a service, or the like), it becomes feasible to increase the number of tickets acquired by the procedure process instructing part 1062. The specific processing flow will be detailed with reference to FIGS. 8 and 9.

Thereafter, the ticket filtering part 1061 receives the tickets from the procedure process instructing part 1062 and narrows down choices of service provider candidates for the need of the user out of the received tickets, based on the personal information 109. For example, concerning a ticket obtained by a search with an ID of wine, supposing the personal information of the user in the current request contains information of "resident in Tokyo" and "interests: overseas travel," tickets about overseas travel and tickets about service providers located in Tokyo will be preferentially listed as superordinate candidates. Then the ticket filtering part 1061 presents the candidates selected as optimal service providers to the user 100. When the user 100 finds a service of some interest, he or she selects a service provider 108 of the service and submits a service process execution request to the service provider 108. Then a contract confirmation process necessary for provision of the service, such as authentication of the user or the like, is carried out between the user 100 and the service provider 108, and then the user 100 authenticated receives the provision of the service.

Structure of Ticket

Here the structure of a ticket will be described with FIG. 6. The ticket contains the following information items (1)–(13).

Namely, (1) ID as a string of numerals and/or characters to specify an object given the ID; (2) an access address of a service provider to provide information or a service related to the ID (service provision location (service entity pointer): e.g., an IP address, a URL, or the like on the network); (3) a storage location of service procedure information containing an access method for connection to the service (service entity access protocol storage location pointer: e.g., an IP address, a URL, a file name, or the like on the network); (4) a ticket category, specific examples of which are, for example, "primary" indicating a ticket that cannot be issued by any other party than the ID issue requester, while indicating what is the one given the ID, "secondary" issued for provision of a service related to the object, and so on; (5) Object Category which is information of a category indicating what is the object given the ID; (6) Object Location which is information indicating where the object given the ID is located; (7) Object Comments describing various information about the object given the ID; (8) Service Category which is information indicating a category of a service about provision of the service related to the object given the ID; (9) Service Location which is information indicating locations and regions where the service related to the object given the ID is provided; (10) Service Comments describing various information about the provision of the service related to the object given the ID; (11) information about the registrant of the ticket; (12) Expiration Date registered for the ticket; (13) Permission Information indicating a party permitted to perform a ticket search and make access.

Among these information items described in the ticket, the information items (2) and (3) are characterized by the possession of the structure having only a pointer so as to be adapted for various services, and the information items (4), (5), (6), (7), (8), (9), and (10) are characterized by the possession of the structure enabling flexible searching and creation of various services. The information items (11) and (12) are characterized by the possession of the minimum structure for securing the validity of the ticket, and the information item (13) is characterized by the possession of the structure for enabling limitation of disclosure of information. Description of information is essential to the information items (1), (2), (3), (4), (11), and (12), but description is optional for the other information items. If there is no description of information, "NULL" is written.

Flow of Ticket Registration-Update Process

Figure 7:
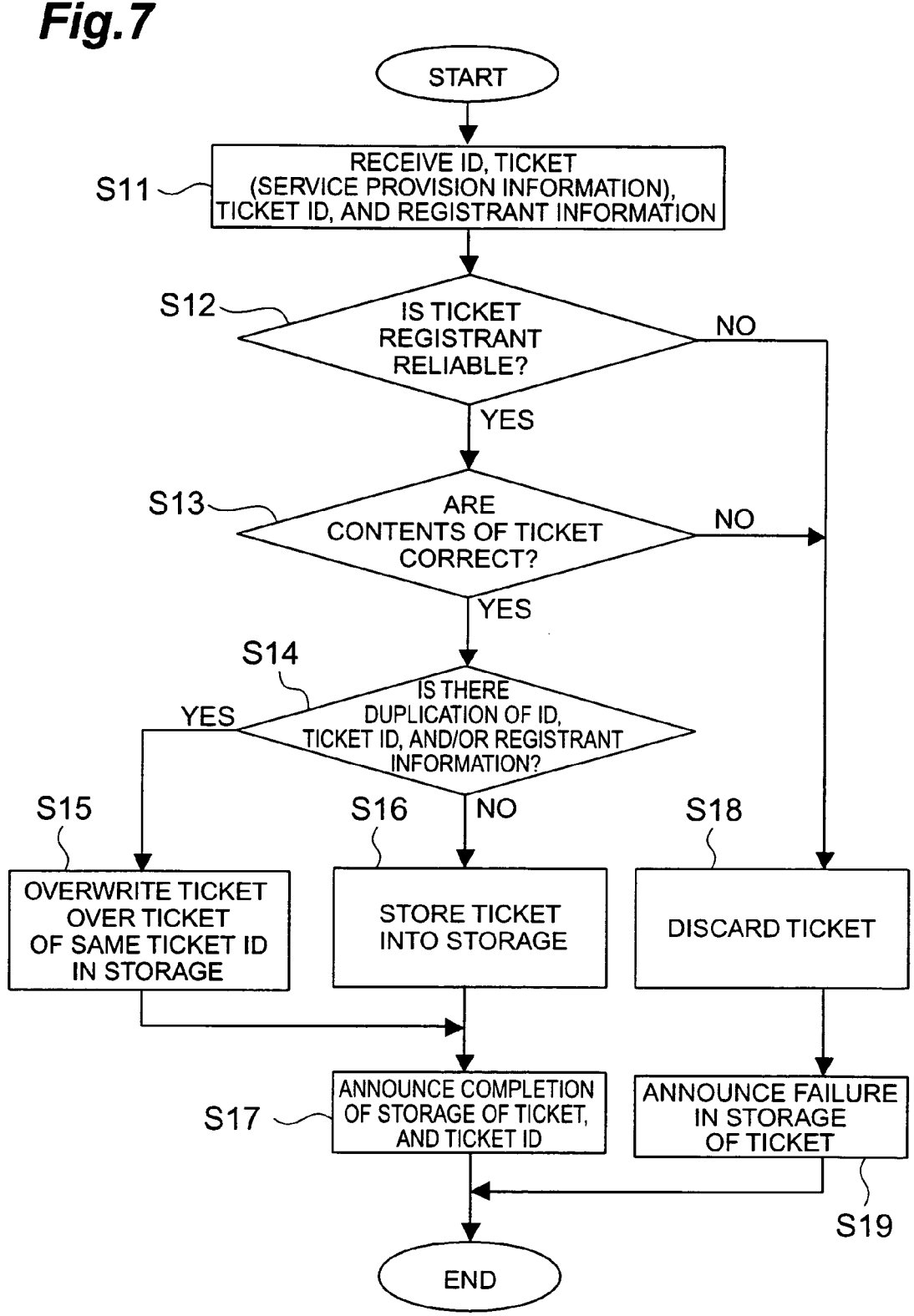
FIG. 7 is a flowchart of the ticket registration-update process.

The flow of the ticket registration-update process for registration and update of the ticket as described above will be described below with reference to FIG. 7.

The ticket management part 105 first receives an ID, the main body of a ticket, a ticket ID (NULL at the first registration), and registrant information (S11 in FIG. 7) and evaluates the reliability of the ticket registrant on the basis of the received ticket registrant information (S12). The evaluation of reliability herein can be performed by various methods; for example, the ticket registrant is evaluated by one selected from a method using an account and a password, a method of changing passwords with change of time, a method of sending a password to a mail address of a requester, etc., or by a combination of two or more thereof.

When it is determined at S12 that the registrant is unreliable, the received ticket is discarded (S18), the registration requester is notified of failure in storage of the ticket (S19), and the processing is terminated. When it is determined at S12 on the other hand that the registrant is reliable, it is then determined whether the contents of the ticket are correct (S13). The process of determining whether the contents of the ticket are correct herein is carried out by checking whether the structure of the ticket conforms to a prescribed structure, whether the essential items to be described in the ticket are present, and so on.

When at S13 the contents of the ticket are incorrect, the received ticket is discarded (S18), the registration requester is notified of the failure in storage of the ticket (S19), and the processing is terminated. When at S13 the contents of the ticket are correct on the other hand, the ticket management part 105 performs a process of determining whether a ticket with an identical ID, an identical ticket ID, and identical registrant information is already stored in the ticket management part 105 (ticket ID check process) (S14). This step determines whether the operation in progress is registration of a ticket or update of a ticket.

When at S14 no ticket with an identical ID, an identical ticket ID, and identical registrant information is found in the ticket management part 105, it is determined that the operation in progress is registration of the ticket, and the ticket is stored into the storage 1052 (S16). Then the ticket registrant 104 (or a ticket updater) is notified of completion of the storage of the ticket and the ticket ID about the stored ticket (S17), and the processing is then terminated.

On the other hand, when at S14 a ticket with an identical ID, an identical ticket ID, and identical registrant information is found in the ticket management part 105, it is determined that the operation in progress is update of the ticket, the new ticket received is overwritten on the previously-stored ticket to be stored (S15). Then the ticket registrant 104 (or the ticket updater) is notified of the completion of storage of the ticket and the ticket ID about the stored ticket (S17), and the processing is then terminated. On this occasion, an effective way for effective use of storage capacity of database is such that it is first determined whether there is a ticket with the ID and all the items in the ticket being identical and if there is the same ticket the ticket is not stored.

Flow of Ticket Search Process

Next, the flow of the ticket search process executed by the ticket storage and the procedure process executer will be described referring to FIG. 8. Here the principal unit carrying out the process will be generally represented by the procedure process executer 106 or the ticket management part 105, instead of the ticket filtering part 1061 and others, because it was previously described with FIG. 5.

Figure 8:
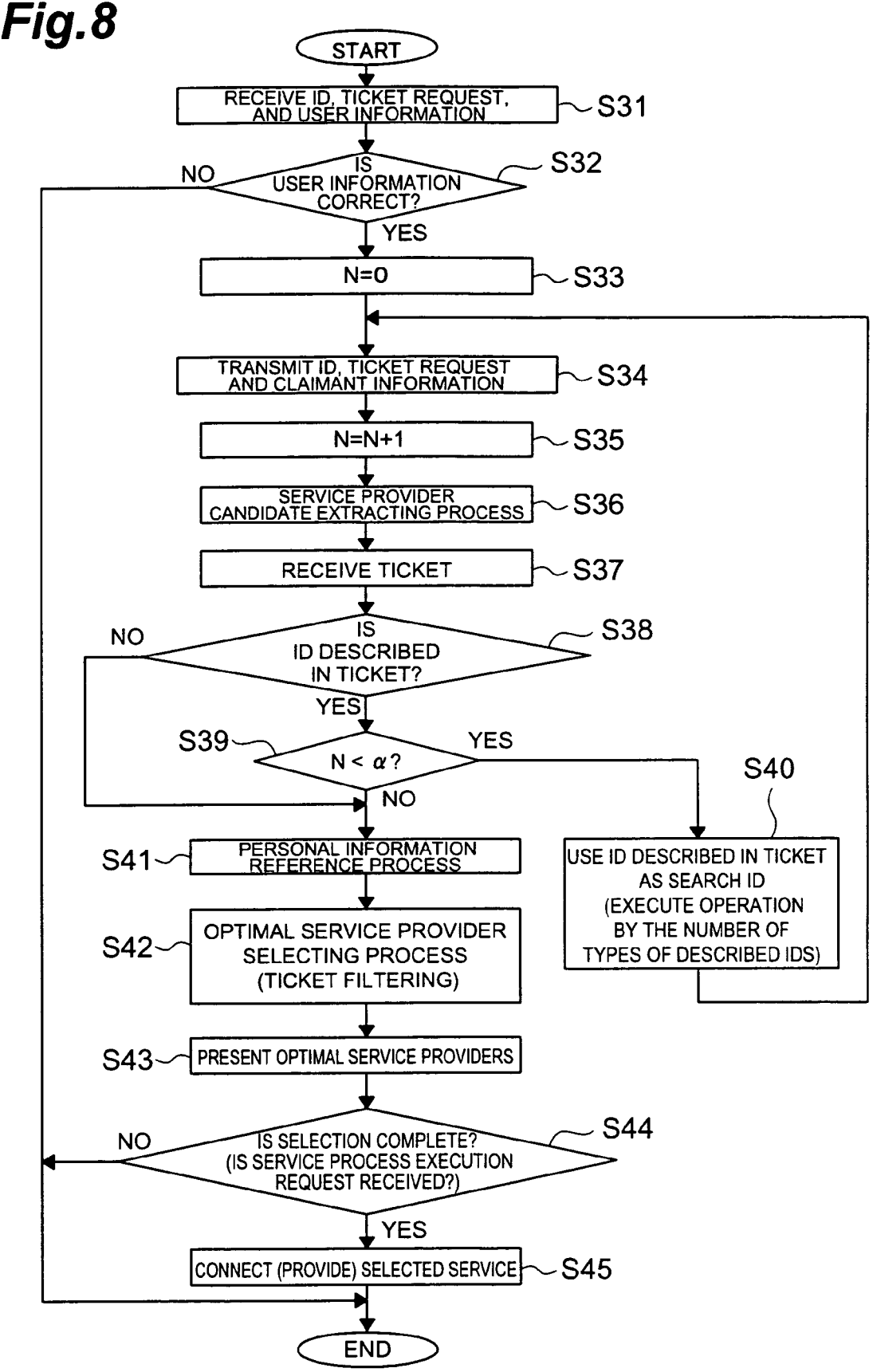
FIG. 8 is a flowchart of the ticket search process in a ticket storage part and the procedure process executer.

First, the procedure process executer 106 receives an ID, a ticket request, and user information from user 100 (S31 in FIG. 8). Then the procedure process executer 106 performs a process of determining whether the user information is correct (S32). When the user information is judged incorrect, the processing is immediately suspended, the user is notified of the suspension of the processing (not shown), and the processing is terminated.

Figure 5:
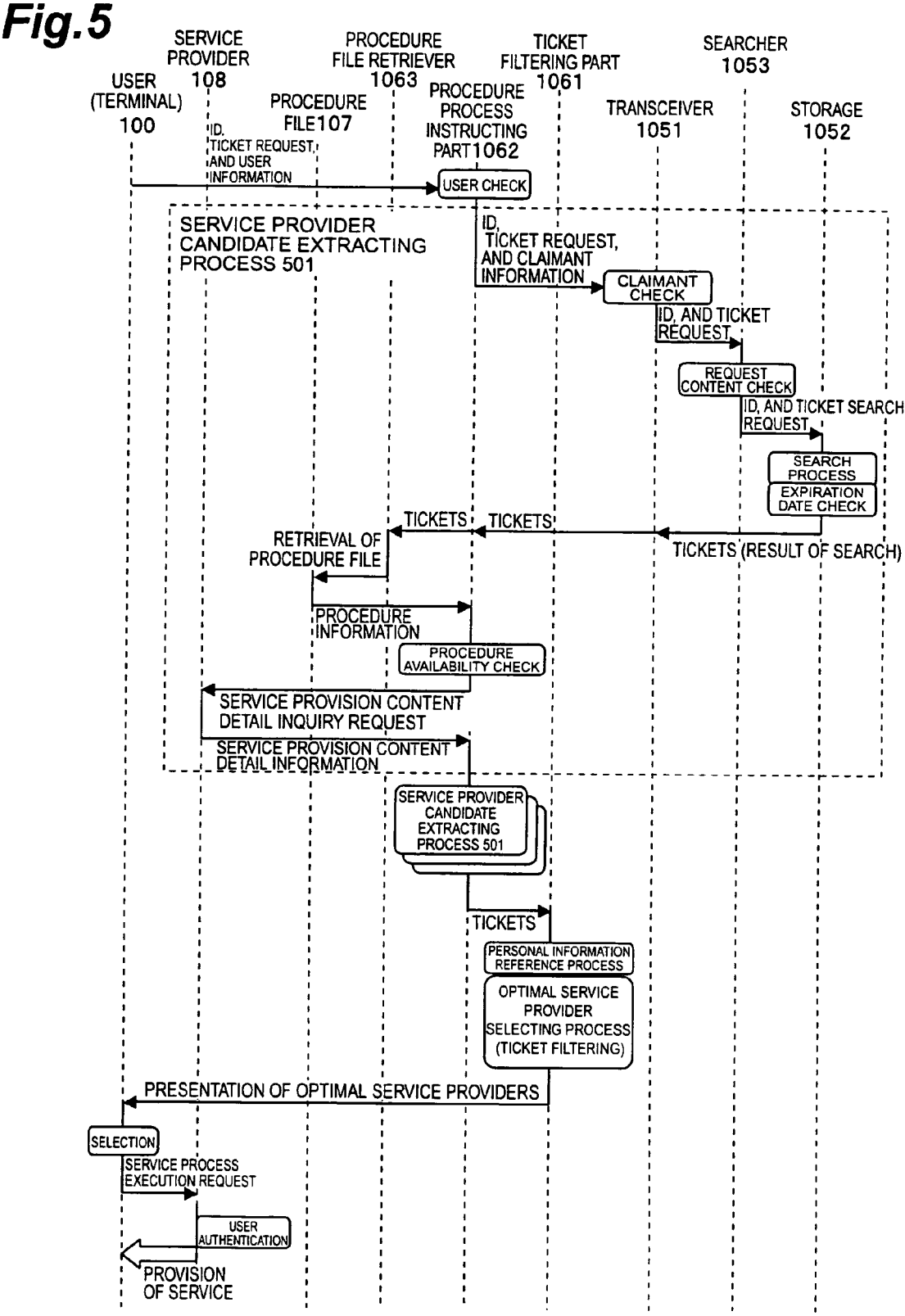
FIG. 5 is a diagram for explaining a ticket search process executed by the ticket management part and a procedure process executed by a procedure process executer.

On the other hand, when at S32 the user information is judged correct, the count N indicating the number of executions of the service provider candidate extracting process 501 of FIG. 5 is reset to zero "0" (S33), and the ID, ticket request, and claimant information are sent to the ticket management part 105 (S34). Then the count N is given an increment of 1 (S35) and the service provider candidate extracting process 501 is carried out (S36). The service provider candidate extracting process 501 will be described later in detail with reference to FIG. 10. After completion of the service provider candidate extracting process 501, the procedure process executer 106 receives a ticket obtained by the search with the ID, and the service provision content detail information about the ticket (S37).

It is then determined whether any ID is described in the items of Object Comments and Service Comments in the received ticket (S38). When no ID is described therein, a personal information reference process is carried out (S41). When an ID is described, it is determined whether the count N is less than an execution limit count $\alpha$ for the service provider candidate extracting process 501 preliminarily determined (S39). When the count N is larger than or equal to the execution limit count $\alpha$, the personal information reference process is carried out (S41). On the other hand, when the count N is less than the execution limit count $\alpha$, the ID described in the ticket is defined as an ID as a target for searching (S40), and the ID, ticket request, and claimant information are again transmitted to the ticket management part 105 (S34). The ticket search process is again carried out by replacing the ID as a target for searching with another in this way, whereby it becomes feasible to implement lateral service provision in alliance with various service providers.

In the personal information reference process at S41, reference is made to the personal information 109 to retrieve such personal information as user's circumstances and user's preference, tendency of purchase, tendency of use of services, and so on. Then a service provider selecting process to select a service provider most suitable for the user is carried out based on the personal information (S42), and service provider candidates thus selected are announced to the user's terminal by an optimal service provider presentation process (S43).

Thereafter, the user determines whether any service provider is to be selected from the service providers thus presented. When one is selected, a service process execution request is sent. For this reason, S44 is configured to determine whether a service provider was selected, based on whether a service process execution request was received from the user. When no service provider is selected, the processing is immediately suspended, the user is notified of the suspension of the processing (not shown), and the processing is then terminated.

On the other hand, when it is determined that a service process execution request was received from the user and thus that a service provider was selected, a connection is established to the service provider thus selected (S45), and the processing is then terminated. This causes the service provider to provide a service to the user.

Next, a flow of a process of carrying out part of the search process with search engine 110 on the network will be described as a modification of FIG. 8 on the basis of FIG. 9. This process with the search engine 110 is effective, for example, in cases including a case where the number of tickets as a result of the search is small.

Figure 9:
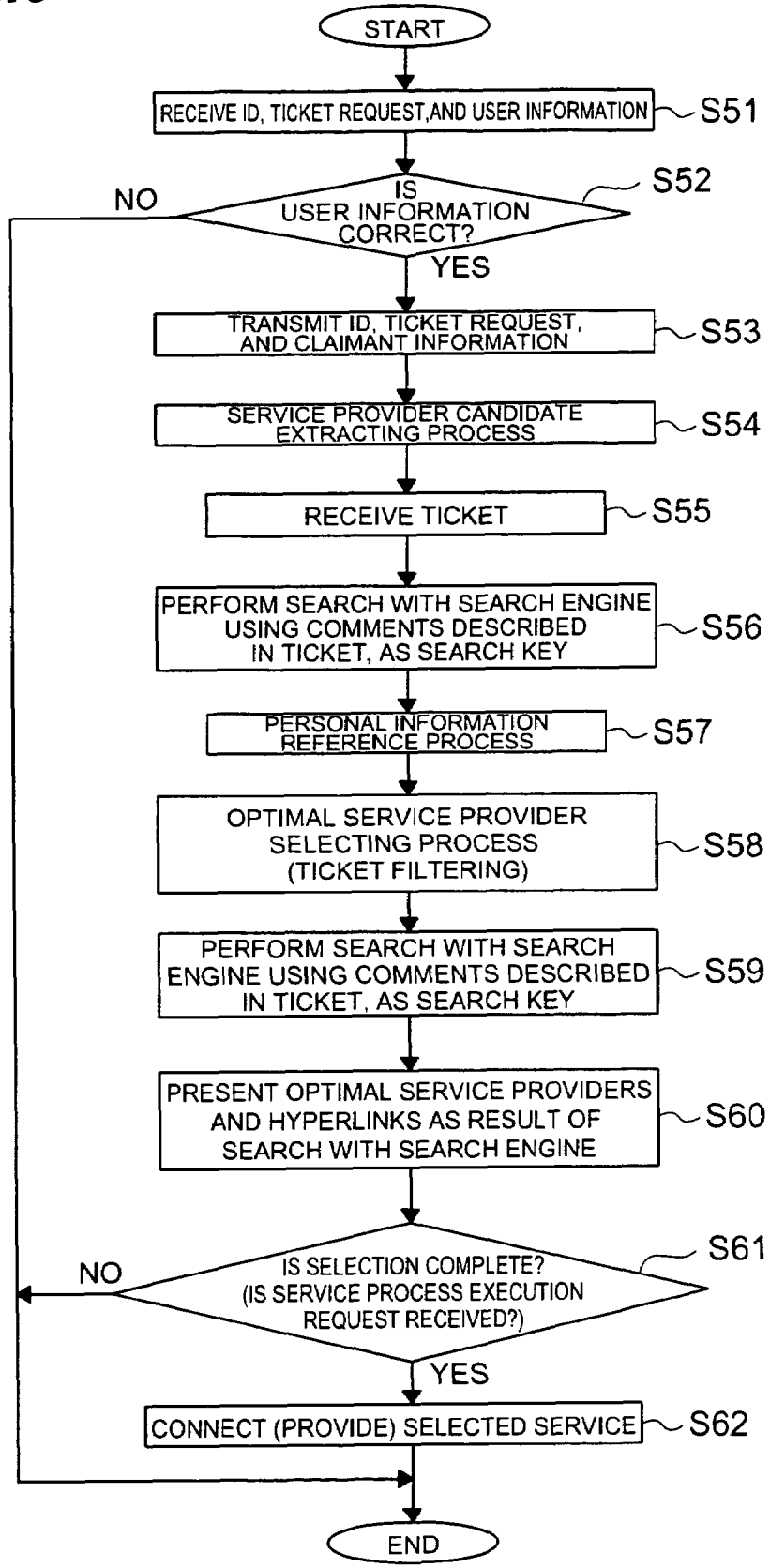
FIG. 9 is a flowchart of processing of carrying out part of the search process with a search engine on a network.

First, the procedure process executer 106 receives an ID, a ticket request, and user information from user 100 (S51 in FIG. 9). Then the procedure process executer 106 performs a process of determining whether the user information is correct (S52). When the user information is judged incorrect, the processing is immediately suspended, the user is notified of the suspension of the processing (not shown), and the processing is then terminated.

On the other hand, when it is determined at S52 that the user information is correct, the ID, ticket request, and claimant information are transmitted to the ticket management part 105 (S53) and the service provider candidate extracting process 501 is carried out (S54). The service provider candidate extracting process 501 will be described later in detail with FIG. 10. After completion of the service provider candidate extracting process 501, the procedure process executer 106 receives a ticket obtained by the search with the ID and the service provision content detail information about the ticket (S55).

Then a search with the search engine 110 is carried out using the comments described in the items of Object Comments and Service Comments in the received ticket, as a search key (S56), and the personal information reference process is carried out (S57). S57 is a step of making reference to the personal information 109 to retrieve such personal information as the user's circumstances and user's preference, tendency of purchase, tendency of use of services, and so on. Then the service provider selection process of selecting a service optimal to the user is carried out based on the personal information (S58).

For every ticket selected herein, a search with the search engine 110 is carried out using the comments described in the items of Object Comments and Service Comments in the ticket, as a search key (S59). The method of carrying out the search over every selected ticket in this way is more effective in making the accuracy of hyperlinks to service providers closer to user's desires. Then service provider candidates selected at S58 and hyperlinks obtained by the search with the search engine 110 are presented to the user's terminal (S60).

Thereafter, the user determines whether any service provider is to be selected from the service providers thus presented. When one is selected, a service process execution request is transmitted. For this reason, S61 is configured to determine whether any service provider was selected, based on whether a service process execution request was received from the user. When no service provider is selected herein, the processing is immediately suspended, the user is notified of the suspension of the processing (not shown), and the processing is then terminated.

On the other hand, when it is determined that a service process execution request was received from the user and thus that a service provider was selected, a connection is established to the service provider thus selected (S62). This causes the service provider to provide a service to the user.

By effectively using the search engine 110 in this way, for example, in the case where the number of searches for tickets is small, it becomes feasible to detect and extract even a service without registration of a ticket, as a service provider candidate.

Flow of Service Provider Candidate Extracting Process

Figure 10:
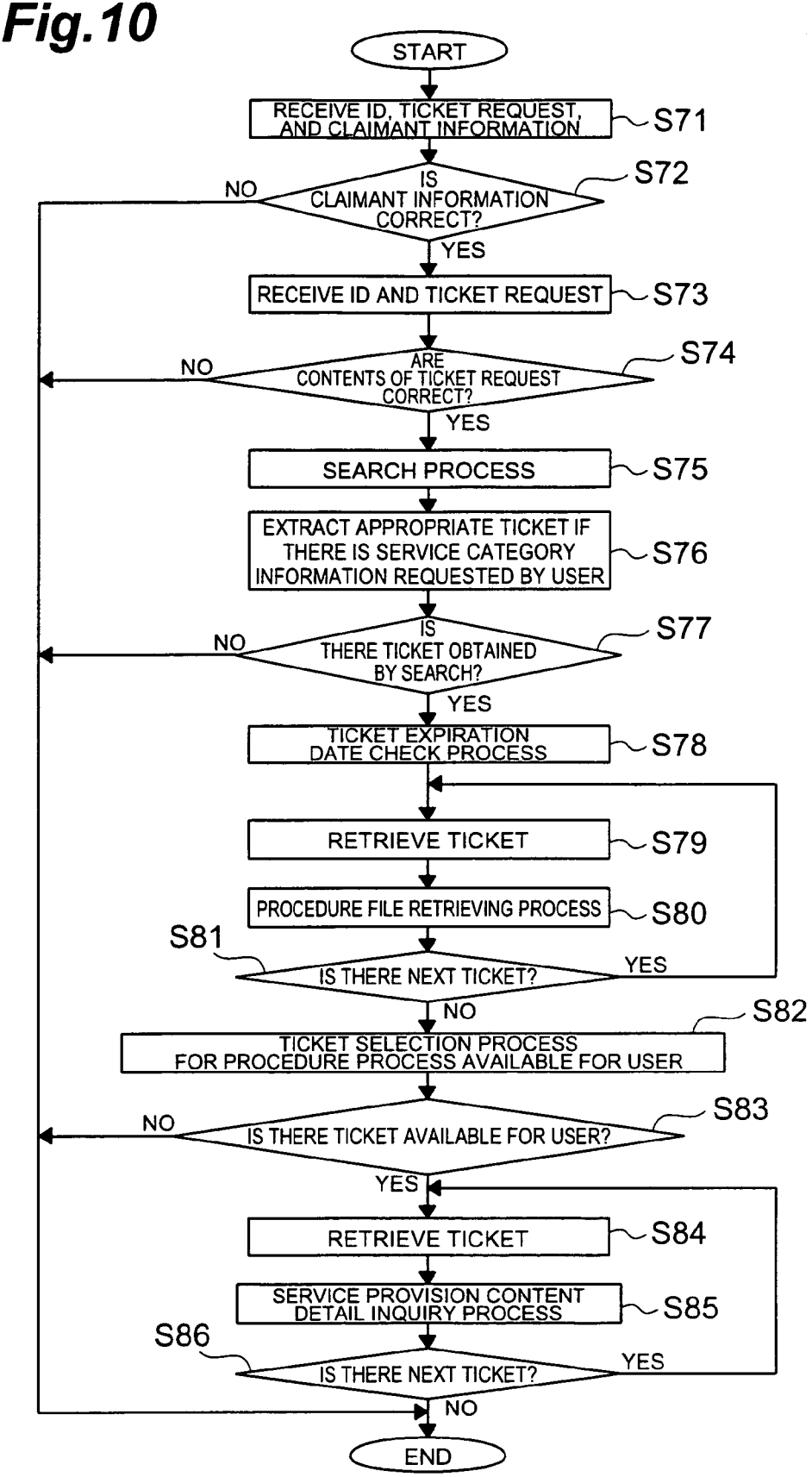
FIG. 10 is a flowchart of a service provider candidate extracting process.

The flow of the service provider candidate extracting process will be described below with reference to FIG. 10.

The procedure process instructing part 1062 in the procedure process executer 106 transmits an ID, a ticket request, and claimant information to the ticket management part 105. On this occasion, if the service category requested by the user is known, the service category can be transmitted to the ticket management part 105, which enables the result of the ticket search to be narrowed down in advance.

The transceiver 1051 in the ticket management part 105 receives the ID, ticket request, and claimant information from the procedure process instructing part 1062 (S71 in FIG. 10) and determines whether the claimant information is correct (S72). When the claimant information is judged incorrect herein, the processing is immediately suspended, the procedure process executer 106 being the claimant is notified of the suspension of the processing (not shown), and the processing is then terminated.

When the claimant information is judged correct on the other hand, the ID and ticket request are transmitted to the search part 1053 (S73). The search part 1053 checks whether there is a problem of discrepancy or the like in the ticket request received, thereby determining whether the contents of the ticket are correct (S74). When the contents of the ticket are incorrect, the processing is immediately suspended, the procedure process executer 106 being the claimant is notified of the suspension of the processing (not shown), and the processing is then terminated.

When the contents of the ticket are correct, the search part 1053 transmits the ID and a ticket search request to the storage 1052. The storage 1052 performs the ticket search process on the basis of the ticket search request received (S75). When the service category requested by the user is designated as a search key in advance, a filtering search is carried out based on the service category information to execute the ticket extracting process (S76).

It is then determined whether there is a ticket obtained by the search (S77). If there is no ticket obtained, the processing is immediately suspended, the procedure process executer being the claimant is notified of the suspension of the processing (not shown), and the processing is then terminated. When there is a ticket obtained on the other hand, a process of checking the expiration date and others of the ticket is carried out (S78), and every ticket having an effective expiration date is transferred as the result of the search from the transceiver 1051 to the procedure file retrieving part 1063.

The procedure file retrieving part 1063 performs a process of reading the received tickets one by one (S79), and then performs a procedure file retrieving process (S80) to acquire the procedure information thereof. Then it is determined whether there is a next ticket not subjected to the procedure file retrieving process yet (S81). When there is an unprocessed ticket, the procedure file retrieving part 1063 again performs the reading process (S79) and the procedure file retrieving process (S80).

When there is no next ticket (i.e., after the procedure files of all the tickets have been retrieved), the procedure process executer 106 determines whether the user having submitted the ticket request is allowed to go through the procedure, based on the personal information 109, so as to select only available tickets (i.e., execute a process of selecting tickets for that the user is permitted to go through the procedure) (S82).

It is then determined whether there is a ticket available for the user (S83). When it is determined that there is no available ticket, the processing is immediately suspended, the procedure process executer 106 being the claimant is notified of the suspension of the processing (not shown), and the processing is then terminated.

When at S83 there is an available ticket on the other hand, a process of retrieving tickets one by one (S84) and the service provision content detail inquiry process is then carried out (S85). It is then determined whether there is a next ticket not subjected to the service provision content detail inquiry process yet (S86). When there is an unprocessed ticket, the ticket retrieving process (S84) and the service provision content detail inquiry process (S85) are again carried out.

When there is no next ticket (i.e., when the service provision content detail inquiry process is completed for all the tickets), the processing is terminated while obtaining tickets and service provision content detail information about the tickets as a result of the processing.

Description of Example of Processing

An example of the processing will be described below with reference to FIGS. 11–14.

Let us suppose herein that three tickets about wine (ID: JAN490136036479) are registered with the ticket management part 105.

When the user 100 looks at object (wine) 101 given the ID of JAN490136036479 and submits a ticket request for the ticket with ID: JAN490136036479, the aforementioned ticket search process results in obtaining the three tickets of FIGS. 11A–11C as a result of the search.

As shown in FIGS. 11A–11C, JAN490136036479 is described in the ID box of all the three tickets. The procedure process executer 106 refers to the ticket category and service category in these tickets and executes the optimal service provider presentation process in order to provide services suitable for the user 100.

FIG. 13 shows an example of an optimal service provider list displayed at the terminal of the user 100. In this example, the information presented about the requested ID (JAN490136036479) includes the information described in the primary ticket shown in FIG. 11A, and the information described in the two secondary tickets shown in FIGS. 11B and 11C, as services related to the ID.

Namely, FIG. 13 shows the search ID, the information of Object Category and the information of Object Comments in the primary ticket of FIG. 11A, the service entity pointer information in the secondary ticket of FIG. 11B, and the service entity pointer information and the information of Service Comments in the secondary ticket shown in FIG. 11C.

By this simple operation wherein service providers to provide services related to an ID register tickets with the services related to the ID, it becomes feasible to implement the linkage among the service providers and to reduce the efforts for the service providers to construct the link information or the affiliation relation to be prepared in advance. It is also feasible to constantly dynamically change and expand the range of selectable service providers for the users.

Next, let us suppose a case wherein one ticket about wine (ID: JAN490136036479) and two tickets related to a place name (ID: Location-ID245699) are registered with the ticket management part 105.

When the user 100 looks at the object (wine) 101 given the ID of JAN490136036479 and submits a ticket request for the ticket with ID: JAN490136036479, the aforementioned ticket search process is carried out to obtain the ticket of FIG. 12A (the ticket with the ID box: JAN490136036479). The Object Comments box of this ticket in FIG. 12A includes the description of Location-ID245699 indicating the production area of the wine as an ID. For this reason, the search process carried out by the procedure process executer 106 results in selecting the ticket of FIG. 12A and further selecting the tickets of FIGS. 12B and 12C as well. The procedure process executer 106 refers to the ticket category and service category in these tickets and carries out the optimal service provider presentation process in order to provide services suitable for the user 100.

FIG. 14 shows an example of the optimal service provider list displayed at the terminal of the user 100. In this example, the information presented about the requested ID (JAN490136036479) includes the information described in the primary ticket shown in FIG. 12A, and the information described in the ticket shown in FIG. 12C, as a service related to the ID. In this example, only the ticket shown in FIG. 12C is selected out of the two tickets of FIGS. 12B and 12C, based on the personal information 109 of the user 100.

Namely, FIG. 14 shows the search ID, the information of Object Category and the information of Object Comments in the primary ticket of FIG. 12A, and the service entity pointer information and the information of Service Comments in the secondary ticket shown in FIG. 12C.

As described above, the first embodiment is able to realize the linkage among service providers by simply describing IDs related to an ID in tickets and is thus able to decrease the efforts for the service providers to construct the link information or affiliation relation to be prepared in advance. It is also able to expand the range of selectable service providers constantly dynamically changing for the users.

Second Embodiment

Configuration of Information Provision Control System

Figure 15:
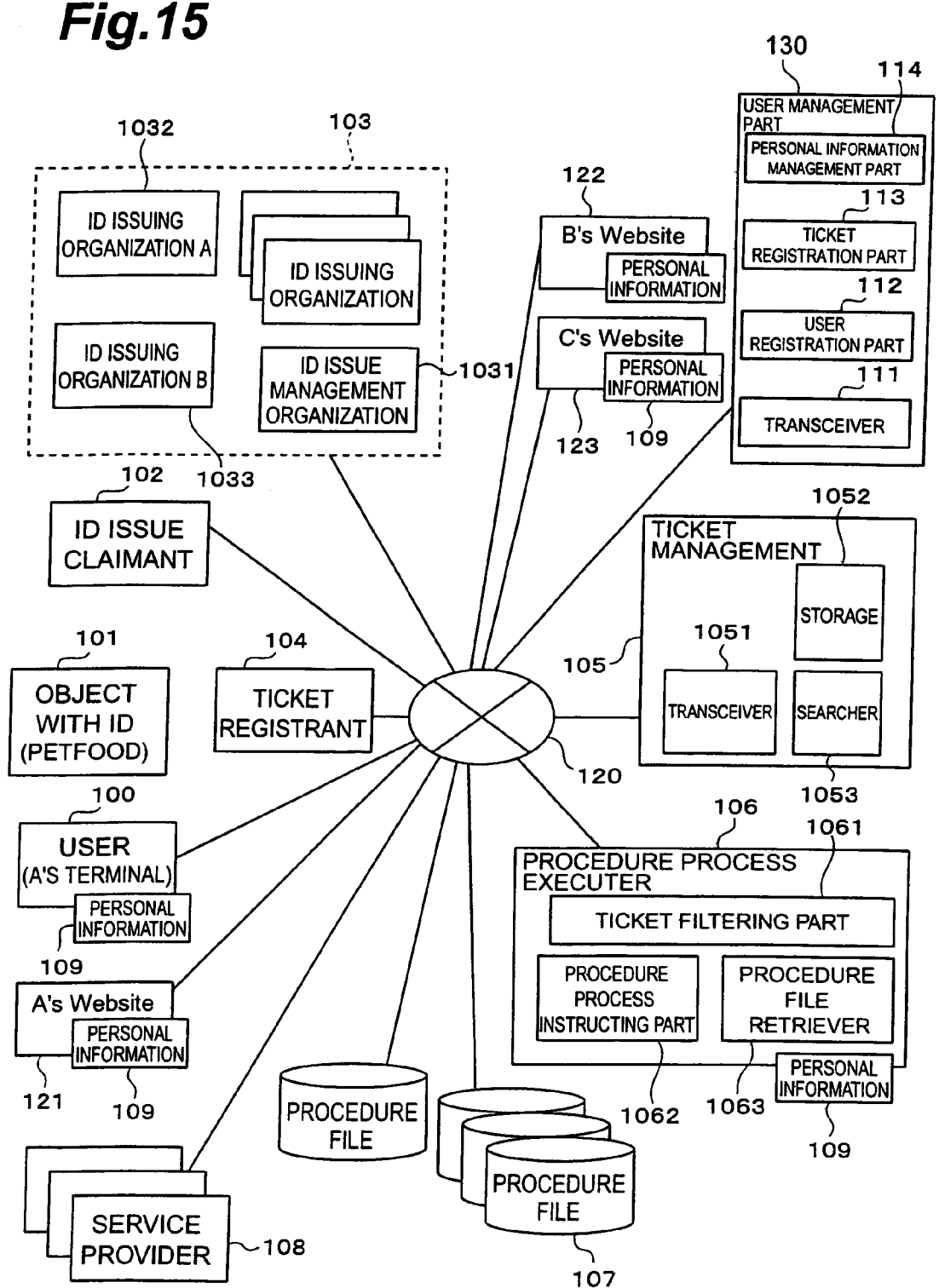
FIG. 15 is a diagram showing a whole configuration of an information provision control system in the second embodiment.

FIG. 15 shows a whole configuration of an information provision control system according to the second embodiment. As shown in this FIG. 15, the information provision control system of the second embodiment is comprised of the following components connected or connectible to network 120. Namely, the information provision control system is comprised of terminal equipment 100 such as a personal computer (PC), a portable information terminal (Personal Digital Assistant: PDA), or a cell phone of a user to receive provision of a service; ID issue requester (e.g., an agency engaging in development and production of a new commodity, a party having gotten a commodity through purchase or the like, etc.) 102 supposed to request issue of a new ID for an object to be given an ID; group 103 of ID issuing organizations permitted to perform the issue of an ID; ticket registrant 104 supposed to request registration of a ticket; ticket management part 105 configured to perform storage and management of a ticket and a search for a ticket; procedure process executer 106 configured to mediate a service to present service provider candidates to users and to carry out procedures associated therewith for the users; procedure file 107; service provider 108 supposed to provide a service through the network, such as sale, repair, or provision of information; personal information 109; user management part 130 in charge of operation of a community; and Web pages 121, 122, 123 for personal transmission of information.

Among these components, the group 103 of ID issuing organizations is comprised of ID issue management organization 1031 in charge of the total management and operation of ID issuing rules for the group 103 of organizations involved in the issue of IDs; and a plurality of ID issuing organizations 1032, 1033 permitted to issue an ID on the basis of an ID issuing rule given by the ID issue management organization 1031.

The ticket management part 105 is comprised of transceiver 1051 configured to perform reception of a ticket registration request to the ticket management part 105, transmission of the result of a search, etc.; storage 1052 being a huge database for storage of tickets; and search part 1053 configured to perform a search for a ticket.

The procedure process executer 106 is comprised of ticket filtering part 1061 configured to select a ticket about a service provider which is requested by the user and about which the user is permitted to conduct a procedure, from the result (a plurality of tickets) of a ticket search based on an ID; procedure file retrieving part 1063 configured to retrieve a procedure file of a ticket from a procedure file storage location described in the ticket (i.e., storage location information (also referred to as a service entity access protocol storage location pointer) of procedure file 107 about access method information to a service provider) described in the ticket; and procedure process instructing part 1062 configured to order a procedure on the basis of the procedure process.

The procedure file 107 is a file containing a description of a protocol used for a procedure and indispensable information (e.g., in the case of the protocol determined in the automotive industry, the information concerns a cipher communication system generally used in the Internet, a unique procedure protocol, and a type of information necessary for the procedure), and is open to the public to permit anyone to access it through network 120. This permits a party intending to provide a new service, to start use by simply selecting an optimal procedure process out of various procedure processes open to the public and writing a storage location of its procedure file in a ticket. Concerning the procedure file 107, it is also possible to perform authentication of a party requesting information and take a measure to properly limit access thereto according to need for ensuring security.

The user management part 130 is comprised of transceiver part 111 configured to transmit or receive information such as user registration or the like; user registration part 112 in charge of registration of a user and management of the user registration information; ticket registration part 113 configured to request the ticket management part 105 to register a ticket about information such as a Web page or the like about the registered user upon the user registration; and personal information management part 114 configured to update the personal information 109 of the user upon the user registration.

The personal information 109 used in the processing described hereinafter contains information such as a name and an address, interests and preference, a list of possessions, types of permitted transactions, an access history to various service providers and a use history thereof, and so on, and this personal information 109 may be held in the terminal 100 by the user, may be held in a format like Web pages 121, 122, 123 in the network, or may be held in the procedure process executer 106 which introduces service providers and mediates procedures. The personal information 109 may also be held while being scattered at a plurality of locations as shown in FIG. 15. It is, however, assumed in that case that the personal information 109 at the plurality of locations is of the same contents and that at an update of personal information all the personal information 109 is updated in synchronism by the personal information management part 114.

The ID-attached object 101 is comprised of an object given an identifier consisting of a combination of numerals and characters as an ID such as a bar code, a two-dimensional bar code, an RF-ID, or an infrared tag, (i.e., a physical object such as a bottle or paper, or an electronic object such as a sound file or an image file).

The various processes and the structure of the ticket associated with the service provision executed in the above information provision control system are much the same as those in the aforementioned first embodiment (reference is made to FIGS. 2 to 10), and the description thereof is thus omitted herein.

Description of Example of Processing where the Present Invention is Applied to a Community An example of processing where the present invention is applied to a community will be described below with referring to FIGS. 16 to 20.

It is supposed herein that three tickets about petfood (ID: 4901234petfood232) are registered with the ticket management part 105 and the user 100 is one routinely purchasing the object (petfood) 101 assigned 4901234petfood232 as an ID.

When this user 100 submits a ticket request about the ticket with ID: 4901234petfood232, the aforementioned ticket search process is carried out to obtain the three tickets of FIGS. 16A–16C as a result of the search.

As shown in FIGS. 16A–16C, 4901234petfood232 is described in the ID box of all the three tickets. The procedure process executer 106 makes reference to the ticket category and the service category in these tickets to execute the optimal service provider presentation process in order to provide services suitable for the user 100.

Figure 21:
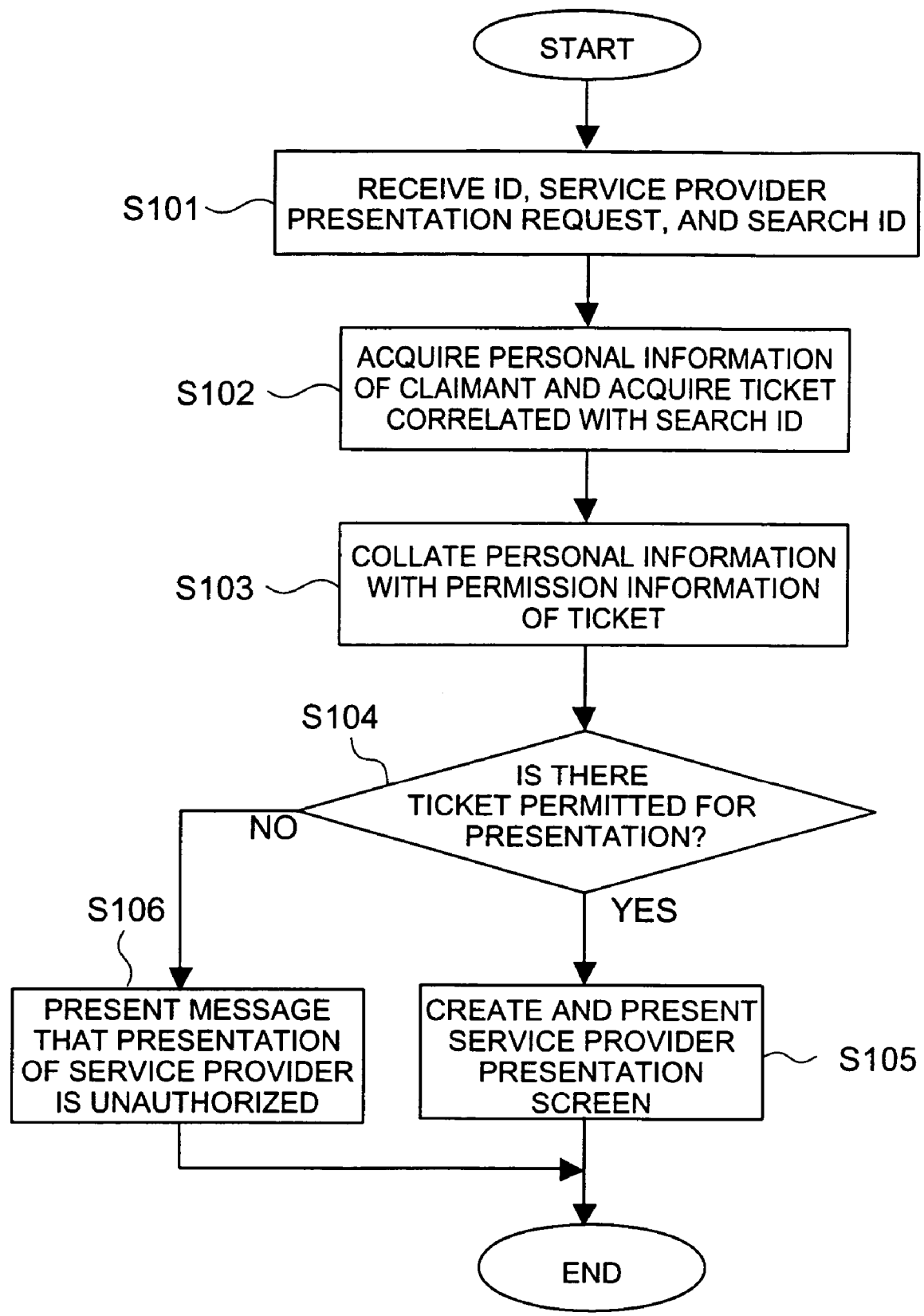
FIG. 21 is a flowchart showing an example of an optimal service provider presentation process.

An example of this optimal service provider presentation process is shown in FIG. 21. Specifically, as shown in FIG. 21, the procedure process executer 106 first receives an ID, a service provider presentation request, and a search ID (S101), and then acquires the personal information of the claimant, using the ID as a key, from the personal information 109 and also acquires a ticket corresponding to the search ID (S102). Then the personal information of the claimant is collated with the permission information of the ticket (S103). It is determined whether there is a ticket whose presentation is permitted, based on the result of the collation (S104). If there is a presentation-permitted ticket, a service provider presentation screen is created on the basis of the information of the ticket and is presented to the claimant (S105). If there is no presentation-permitted ticket on the other hand, the fact that no service provider is available is presented to the claimant (S106).

For example, FIG. 17A shows a service provider presentation screen that person A can consult before membership registration with a community operated by a petfood group, and FIG. 17B shows A's personal information at that time. Since person A is unregistered with the community, petfoodID in the A's personal information includes no description (petfoodID=NULL) as shown in FIG. 17B. Suppose person A in this state finds 4901234petfood232 as petfoodID on a package of a certain petfood and submits a service provider presentation request with this petfoodID as a search ID. According to the above processing of FIG. 21, the three tickets of FIGS. 16A–16C with ID: 4901234petfood232 are selected as candidates for presentation.

However, since petfoodID=NULL in A's personal information, as a result of the collation between this information and the permission information of each of the tickets of FIGS. 16A–16C, the service provider information presented to person A is only the page associated with the ticket of FIG. 16A (which can be identified as a page to transmit information about petfood and organize a petfood group from its Object Comments). Namely, since it is determined with the tickets of FIGS. 16B and 16C that the permission information disagrees with the A's personal information, person A is not permitted to access the pages. Therefore, the accessible service provider presentation screen presented to person A includes only the display of the information about the ticket of FIG. 16A, as shown in FIG. 17A. Since a separate authentication procedure with a password or the like is carried out for the claimant upon an actual access to the information, even if unauthorized procedure process executer 106 operates to present the service provider information to a user without permission, the actual information is not presented to the user without permission.

Figure 18:
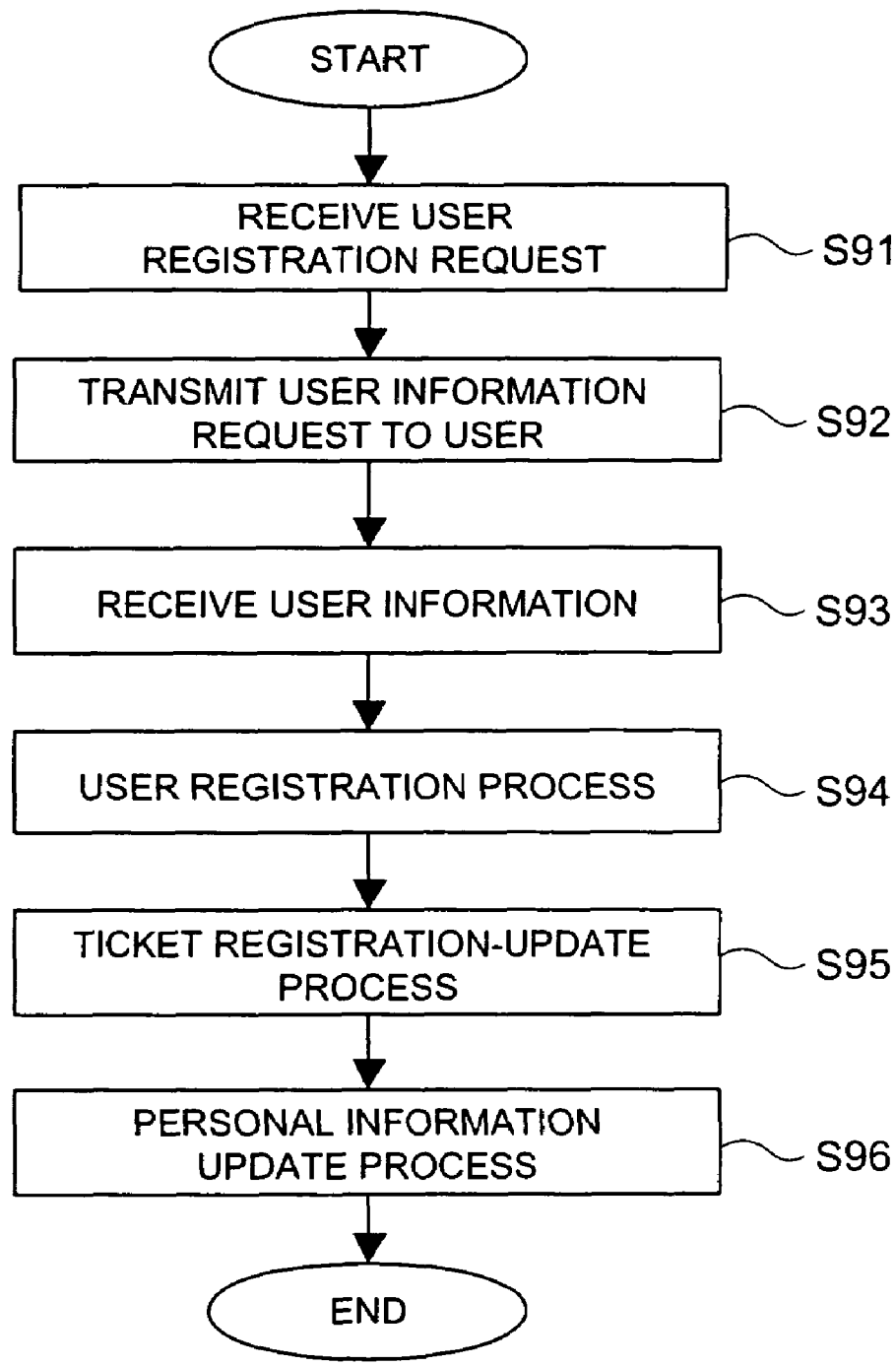
FIG. 18 is a flowchart of a user registration process in a user management part in charge of operation of a community.

Now, the flow of the user registration process at the user management part 110 in charge of the operation of the community will be described with reference to FIG. 18. The user management part 110 receives a user registration request from the user (for example, person A) 100 through the transceiver part 111 (S91), and then lets the user registration part 112 transmit a request for transmission of predetermined user information to the user 100 (S92). When the transceiver 111 receives the user information from the user 100 (S93), the user registration part 112 performs a process of registering the user information thus received (S94).

After completion of this user registration process, the ticket registration part 113 submits a ticket registration request to the ticket management part 105 to register a ticket about transmission of information of the user 100 in order to make the user 100 take part in formation of the community (S95). This causes an address or the like of a page for transmission of information from the user 100 to be registered in the form of a ticket with the ticket management part 105, and the above ticket search process and others bring the page of the user 100 into an accessible state to the other users forming the community.

For example, supposing the user 100 is person A, a ticket as shown in FIG. 19 is registered with the ticket management part 105. Since "petfoodID=4901234petfood232" being the common information to the members in the community operated by the petfood group is set in the permission information of the ticket of FIG. 19 herein, the other users in the community are permitted to consult the A's page by the permission information in the ticket of FIG. 19.

Then the personal information management part 114 performs an update process of giving an ID indicating membership of the community to the personal information of the user 100 in the personal information 109 (S96). This permits the user 100 to consult information transmitted by participants forming other communities. The personal information in the personal information 109 can be updated in this way by the personal information management part 114. It is, however, assumed herein that at the update the personal information management part 114 performs the update on the condition that it receives an update permission from the user 100 as a target for the update or from the procedure process executer 106.

For example, FIG. 20B shows an example of A's personal information after the registration. As shown in this FIG. 20B, after person A is registered as a user in the community, petfoodID=4901234petfood232 is automatically added as A's personal information.

When person A in this state submits a service provider presentation request with 4901234petfood232 as a search ID, the above processing of FIG. 21 results in selecting the three tickets of FIGS. 16A–16C with ID: 4901234petfood232 as candidates for presentation. However, since the above update resulted in registering petfoodID=4901234petfood232 as A's personal information, the permission information in the tickets of FIGS. 16B and 16C comes to agree with the A's personal information, thus permitting person A to consult the B's page and C's page corresponding to these tickets. Accordingly, the accessible service provider presentation screen presented to person A after the membership registration includes the display of the information about the ticket of FIG. 16A (the Web page of petfood) and the display of the link information of the B's and C's pages corresponding to the tickets of FIGS. 16B and 16C (links to the respective pages), as shown in FIG. 20A.

As described above, the second embodiment allows the user to be registered as a user in a community, whereby the ticket registration process (S95 in FIG. 18) and the personal information update process (S96) are automatically executed, so as to permit the user to participate in the information transmission type community managed by a plurality of scattered servers. The present embodiment facilitates formation of a community and enables interconnection of information transmission pages without complicated efforts to construct the link information and affiliation relation.

It is noted that the present invention can also be applied to control over general information provision, in addition to the operation of communities, without having to be limited to the application to communities.

In the present invention, in the process of developing the processing from a search for a certain ticket to a search for a new ticket, the processing may be developed using a "new ID (ID corresponding to a new ticket)" included in the original ticket, as a key, or the processing to the search for the new ticket may be developed by first deriving a "new ID" on the basis of "various information" included in the original ticket without being limited to the "ID," and using the "new ID" as a key.

As described above, the present invention has substantiated the decrease of the efforts to construct the link information and affiliation relation prepared for linkage with many service providers (or information providers) and the timely service provision and information provision suitable for the users, for both the service providers (or information providers) and the users.

What is claimed is:

1. A computer program product stored on a tangible medium that stores instructions which when executed by a service provision computer system, causes the computer system to execute the steps comprising:

providing a procedure file that stores access method information for connection to a service;

storing and managing a plurality of tickets, each ticket comprising a first identifier given to a commodity, an access address of a service provider for providing a service related to the commodity, storage location information of the procedure file, and both or one of information about the commodity and information about the service related to the commodity;

searching, based on the first identifier and a ticket request submitted by a user, a ticket of the plurality of tickets corresponding to the first identifier;

retrieving from the ticket obtained by the search the corresponding storage location information of the procedure file and retrieving access method information from the procedure file based on the storage location information;

retrieving a corresponding access address of a corresponding service provider included in the ticket obtained by the search, requesting service provision content information from the service provider based on the access address of the service provider, and acquiring the service provision content information about the service in accordance with an access method stored in the procedure file; and presenting at least one of the information about the commodity included in the ticket, the information about the service, the access method information retrieved, and the service provision content information acquired, wherein the ticket further comprises information for deriving a second identifier different from the first identifier, as the information about the commodity or as the information about the service, and wherein the searching comprises generating the second identifier based on information acquired from the ticket obtained by the search, and searching for a ticket corresponding to the second identifier.

2. The computer program product according to claim 1, further comprising:

accepting the first identifier and the ticket request submitted by the user, with identification information of the user; and storing user information comprising user's preference information and service use information, in correlation with the identification information of the user, wherein the presentation comprises retrieving user information correlated with the identification information of the user acquired in the accepting step, selecting a service provider based on the user information and the service provision content information, and presenting the service provision content information and access method information about the service provider thus selected.

3. The computer program product according to claim 1, wherein the presentation comprises:

performing a search with a search engine, using a keyword included in the information about the commodity or in the information about the service, as a search key, and presenting link information obtained by the search.

4. A service provision method executed in a service provision system, the method comprising:

providing a procedure file that stores access method information for connection to a service;

storing and managing a plurality of tickets, each ticket comprising a first identifier given to a commodity, an access address of a service provider for providing a service related to the commodity, storage location information of the procedure file, and both or one of information about the commodity and information about the service related to the commodity;

searching, based on the first identifier and a ticket request submitted by a user, a ticket of the plurality of tickets corresponding to the first identifier;

retrieving from the tickets obtained by the search corresponding storage location information of the procedure file and retrieving access method information from the procedure file based on the storage location information;

retrieving an access address of the corresponding service provider included in the ticket obtained by the search, requesting service provision content information from the service provider based on the access address of the service provider, and acquiring the service provision content information about the service in accordance with an access method stored in the procedure file; and presenting at least one of the information about the commodity included in the ticket, the information about the service, the access method information retrieved, and the service provision content information acquired, wherein the ticket further comprises information for deriving a second identifier different from the first identifier, as the information about the commodity or as the information about the service related to the commodity, and wherein the searching comprises generating the second identifier based on information acquired from the ticket obtained by the search, and searching for a ticket corresponding to the second identifier.

5. The service provision method according to claim 4, further comprising:

accepting the first identifier and the ticket request submitted by the user, with identification information of the user; and storing user information comprising user's preference information and service use information, in correlation with identification information of the user, wherein the presentation comprises, retrieving user information correlated with the identification information of the user, selecting a service provider based on the user information and the service provision content information, and presenting the service provision content information and access method information about the service provider thus selected.

6. The service provision method according to claim 4, wherein the presentation step comprises:

searching with a search engine, using a keyword included in the information about the commodity or in the information about the service, as a search key, and presenting link information obtained by the search.

7. A computer program product stored on a tangible medium that stores instructions to be executed by an information provision control computer system which when executed on the computer system, causes the computer system to execute instructions comprising:

providing a procedure file that stores access method information for connection to a service;

storing and managing a plurality of tickets, each ticket comprising a first identifier given to a commodity, an access address of a service provider for providing a service related to the commodity, storage location information of the procedure file, and both or one of information about the commodity and information about the service related to the commodity;

accepting the first identifier and a ticket request submitted by a user, with identification information of the user;

storing user information comprising user's preference information and service use information, in correlation with identification information of the user;

searching, based on the first identifier and a ticket request acquired from the user, a ticket of the plurality of tickets corresponding to the first identifier;

retrieving from the ticket obtained by the search corresponding storage location information of the procedure file and retrieving access method information from the procedure file based on the storage location information;

retrieving a corresponding access address of a corresponding service provider included in the ticket obtained by the search, requesting service provision content information from the service provider based on the access address of the service provider, and acquiring the service provision content information about the service in accordance with an access method stored in the procedure file; and presenting at least one of the information about the commodity included in the ticket, the information about the service, the access method information retrieved, and the service provision content information acquired, wherein the ticket further comprises permission condition information indicating a condition for the user to whom presentation of the information included in the ticket is permitted, and wherein the presentation comprises, retrieving user information correlated with identification information of the user acquired in the acceptance step, determining whether the presentation of the information in the ticket to the user is to be permitted, based on the user information and the permission condition information in the ticket, and performing the presentation to the user when the presentation is permitted.

8. The computer program product according to claim 7, further comprising:

keeping and managing predetermined registration information of members belonging to a community and, in response to the registration request from the member, registering corresponding registration information of the member; and accepting a registration request for registration of a ticket comprising an identifier given to a commodity related to the member information and an access address of the member, which is submitted from the registered member becoming the service provider and desiring to provide information of the access address of the member, and registering the ticket, wherein the storing and managing registers a new ticket comprising the identifier and the access address, based on the registration request for registration of the ticket.

9. The computer program product according to claim 7, further comprising:

keeping and managing predetermined registration information of members belonging to a community and, in response to the registration request from a member, registering corresponding registration information of the member; and accepting an information presentation request for presentation of information of a ticket about a commodity related to the member information from the registered member, and updating the member information stored during the keeping and managing step, to correlate the member information with the permission condition information about the ticket so as to permit the presentation of the information in the ticket to the user.

10. An information provision control method executed in an information provision control system, the method comprising:

providing a procedure file that stores access method information for connection to a service;

storing and managing a ticket comprising a first identifier given to a commodity, an access address of a service provider for providing a service related to the commodity, storage location information of the procedure file, and both or one of information about the commodity and information about the service related to the commodity;

storing user information comprising user's preference information, in correlation with identification information of the user;

accepting the first identifier and a ticket request submitted by the user, with identification information of the user;

searching, based on the first identifier and the ticket request acquired in the accepting step, a ticket corresponding to the first identifier;

retrieving from the ticket obtained by the search corresponding storage location information of the procedure file and retrieving access method information from the procedure file based on the storage location information;

retrieving an access address of a service provider included in the ticket obtained by the search, requesting service provision content information from the service provider based on the access address of the service provider, and acquiring the service provision content information about the service in accordance with an access method stored in the procedure file; and presenting at least one of the information about the commodity included in the ticket, the information about the service, the access method information retrieved, and the service provision content information acquired, wherein the ticket comprises permission condition information indicating a condition for the user to whom presentation of the information included in the ticket is permitted, and wherein the presentation step is configured to retrieve user information correlated with the identification information of the user acquired in the accepting step, to determine whether presentation of the information in the ticket to the user is to be permitted, based on the user information and the permission condition information in the ticket, and to perform the presentation to the user when the presentation is permitted.

11. The information provision control method according to claim 10, further comprising:

keeping and managing predetermined registration information of users belonging to a community and, in response to a registration request from the user, registering corresponding registration information of the user;

registering the ticket based on a registration request for registration of a ticket comprising an identifier given to a commodity related to the user information of the user and an access address of the user, which is submitted by the registered user becoming the service provider and desiring to provide information of the access address of the user; and registering a new ticket comprising the identifier and the access address, based on the registration request for registration of the ticket.

12. The information provision control method according to claim 10, further comprising:

keeping and managing predetermined registration information of users belonging to a community and, in response to a registration request from a user, registering corresponding registration information of the user, and updating, based on an information presentation request for presentation of information of a ticket about a commodity related to the user information of the user, which is submitted by the registered user, the user information of the user, to correlate the user information of the user with the permission condition information about the ticket so as to permit the presentation of the information in the ticket to the user.

* * * * *